(12) United States Patent
Litvinov et al.

(10) Patent No.: US 8,113,444 B2
(45) Date of Patent: Feb. 14, 2012

(54) LIGHT CLEANING DEVICE FOR A VECHICLE

(75) Inventors: Konstantin Litvinov, Kansas City, MO (US); Michael Levitsky, Beer Sheva (IL)

(73) Assignee: Raviv-Agriculture Cooperative Societies Ltd., D.N. Halutza (IL)

( * ) Notice: Subject to any disclaimer, the term of this patent is extended or adjusted under 35 U.S.C. 154(b) by 178 days.

(21) Appl. No.: 12/087,238

(22) PCT Filed: Feb. 6, 2007

(86) PCT No.: PCT/IL2007/000151
§ 371 (c)(1),
(2), (4) Date: Jul. 21, 2008

(87) PCT Pub. No.: WO2007/091249
PCT Pub. Date: Aug. 16, 2007

(65) Prior Publication Data
US 2009/0014555 A1    Jan. 15, 2009

(30) Foreign Application Priority Data

Feb. 6, 2006  (IL) .......................................... 173561

(51) Int. Cl.
*B05B 1/10* (2006.01)
*B60S 1/46* (2006.01)
(52) U.S. Cl. ............... 239/284.2; 239/284.1; 239/288.5; 239/570
(58) Field of Classification Search ............... 239/284.1, 239/284.2, 288.5, 570; 15/250.01–250.05, 15/250.001–250.003
See application file for complete search history.

(56) References Cited

U.S. PATENT DOCUMENTS

| 4,955,543 A | * | 9/1990 | Orth et al. ................... 239/284.2 |
| 5,242,114 A | * | 9/1993 | Camier et al. .............. 239/284.2 |
| 5,605,286 A | | 2/1997 | Orth et al. |
| 5,762,271 A | | 6/1998 | Lind et al. |
| 6,152,385 A | | 11/2000 | Nuber et al. |
| 6,520,659 B2 | | 2/2003 | Nishiyama et al. |
| 6,752,329 B1 | * | 6/2004 | Price ........................... 239/284.2 |
| 6,793,153 B2 | * | 9/2004 | Hirose et al. ................ 239/284.1 |

(Continued)

FOREIGN PATENT DOCUMENTS

DE            2 235 877 B1    1/1974

(Continued)

OTHER PUBLICATIONS

European Search Report, Application No. EP 11 16 8825, completed Aug. 26, 2011.

*Primary Examiner* — Dinh Nguyen
(74) *Attorney, Agent, or Firm* — The Nath Law Group; Susanne M. Hopkins; William L. Klima

(57) ABSTRACT

A light cleaning device for washing lights located on an external portion of a vehicle. The device has an elongate housing formed with an inlet port connectable to a source of pressurized liquid and a rinsing head fitted with at least one jet nozzle. The jet nozzle is mounted at a distal end of a telescopically retractable hollow tube of the device, which is normally retracted. There is a liquid flow path from the housing to the rinsing head which can emit a jet spray therefrom when the tube is projected from the housing. The nozzle may have a jet forming member fitted therein to turbulate the jet spray fluid.

15 Claims, 22 Drawing Sheets

U.S. PATENT DOCUMENTS

| | | | |
|---|---|---|---|
| 7,555,807 B1 * | 7/2009 | Mastandrea | 15/313 |
| 2005/0121539 A1 | 6/2005 | Takada et al. | |
| 2006/0114666 A1 * | 6/2006 | Sakai et al. | 362/96 |

FOREIGN PATENT DOCUMENTS

| | | |
|---|---|---|
| DE | 27 13 747 B1 | 9/1978 |
| DE | 27 49 658 B1 | 5/1979 |
| DE | 28 08 342 A1 | 9/1979 |
| DE | 199 04 988 A1 | 8/2000 |
| DE | 102 23 187 A1 | 12/2002 |
| EP | 1 031 481 A2 | 8/2000 |
| FR | 2 372 056 A1 | 6/1978 |
| FR | 2 836 842 A1 | 9/2003 |
| FR | 2 863 234 A1 | 6/2005 |
| GB | 1 441 952 | 7/1976 |
| GB | 1 597 004 | 9/1981 |
| GB | 2 272 363 A | 5/1994 |
| JP | 10-119731 A2 | 5/1998 |

* cited by examiner

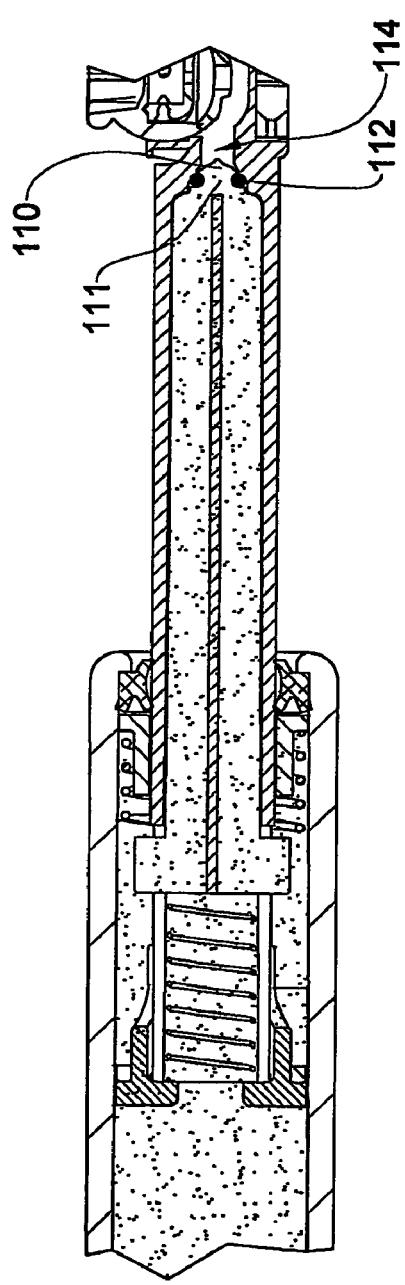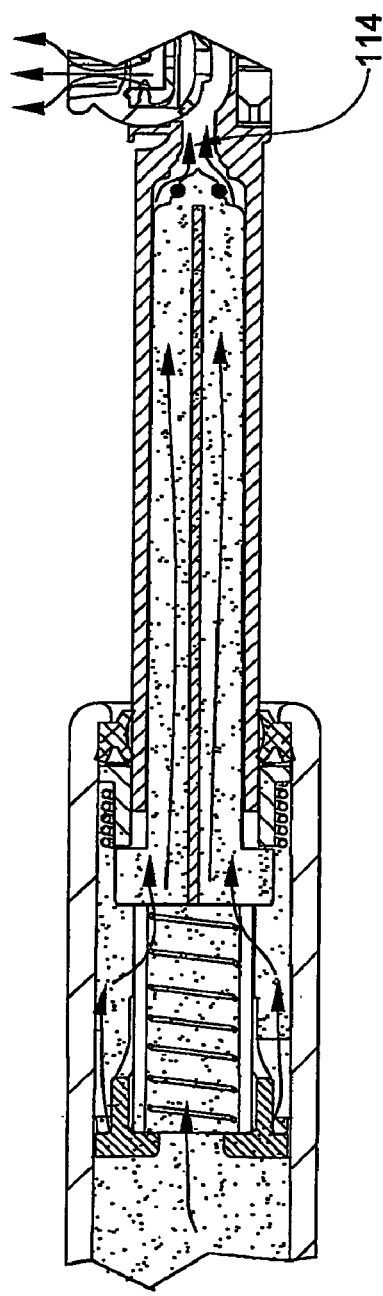

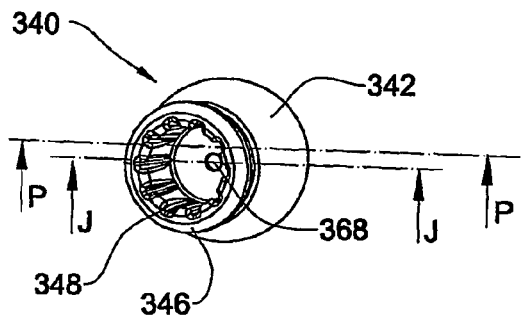
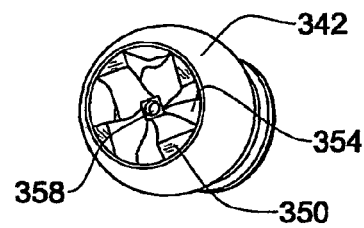
FIG. 21A          FIG. 21B
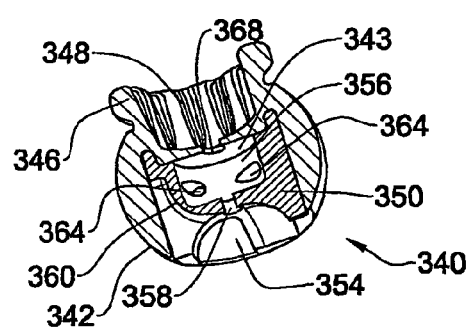
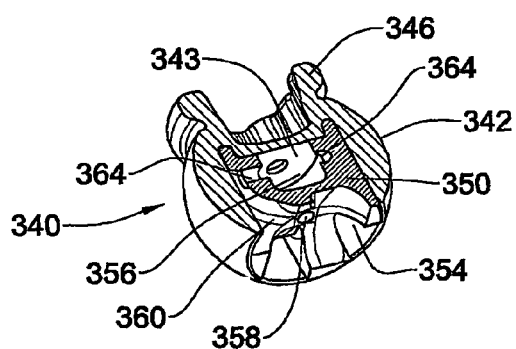
FIG. 21C          FIG. 21D
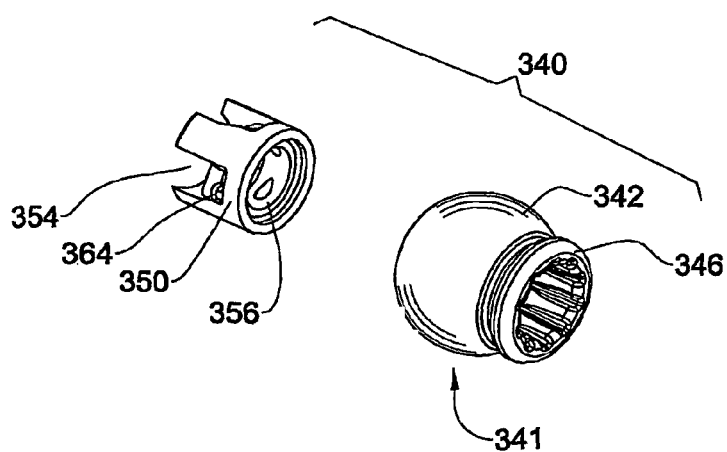
FIG. 21E

LIGHT CLEANING DEVICE FOR A VECHICLE

FIELD OF THE INVENTION

The present invention relates to light cleaning devices for vehicles and more specifically to washing devices using jets for spraying the lights located on an external portion of a vehicle.

BACKGROUND OF THE INVENTION

Visibility is an essential safety aspect for all vehicle drivers. Therefore vehicles such as cars and trucks are normally fitted with exterior lights such as headlights/headlamps to aid drivers to see in dark or unclear environments.

In order to further increase visibility and reduce energy consumption and maintenance expenses, High Intensity Discharge (HID) lights such as Xenon systems are now also being added to vehicles. In recent years attention has been drawn to safety issues regarding driver visibility and use of Xenon systems and as a result in certain places such as Europe headlamp cleaning devices have become mandatory for Xenon systems (Euro Standard ECE R45). However, the need for assuring clean headlights at all times is not limited to a particular type of light.

With an increasing number of countries introducing such regulations and with the growing awareness of vehicle safety, there has emerged a need for new and used cars to be fitted with light cleaning devices.

The cleaning devices are generally installed in a front portion of the car and shoot a jet spray of washing liquid to an external surface of the headlamp to remove dirt therefrom and thus increase driver visibility and even more so to reduce or eliminate blinding of a driver in an upcoming vehicle (owing to dirt on the lamp shield de-fragmenting the light).

It should be noted that a combination of high velocities at which vehicles may be operated combined with necessary cavities in the device, for the use of jet sprays, make the cleaning device itself a potential victim of dirt penetration.

Examples of light cleaning devices of the relevant type are disclosed in the following references:

U.S. Pat. No. 5,242,114 discloses a motor vehicle headlamp glass washing apparatus comprising a jet nozzle mounted on a retractable jet carrier and supplied selectively from a source of washing liquid under pressure. The jet carrier comprises a variable volume chamber, which is defined by a fixed element and a movable element which slides on the fixed element and which carries the jet nozzle. A spring acts between the fixed and movable elements to bias the movable element into a retracted position. Supply of liquid under pressure to the variable volume chamber initially moves the movable element against the action of the spring into a deployed position, and then supplies the liquid to the jet nozzle. The fixed element is a tube open at a free end and connected to the liquid source at its other end, the movable element comprising a closed body having an internal space communicating with the jet nozzle. This space is delimited by a first part sliding sealingly on the outside of the tube, and a second part penetrating into the tube so as to close the latter and movable outwardly in the tube under the action of the pressurized liquid so as to bring the interior of the tube into communication with the internal space in the movable element.

U.S. Pat. No. 4,955,543 discloses pane washing apparatus for a motor vehicle comprising a pressure source to drive a cleaning liquid which in turn activates a valve and a jet nozzle associated with a jet-nozzle carrier which is movable from a pulled-back rest position to an operational, deployed position. The valve is first opened once the jet-nozzle carrier has moved the jet nozzle to the deployed position. The valve includes a cap which loosely covers a passage opening in the jet-nozzle carrier leading to the jet nozzle but which follows movement of the jet-nozzle carrier until its peripheral area contacts a fixed stop thereby uncovering the passage opening immediately before the jet nozzle reaches its deployed position. The cap is pressed against the jet-nozzle carrier by cleaning liquid pressure, a spring or a permanent magnet.

U.S. Pat. No. 5,605,286 is concerned with a nozzle carrier for a windshield washing apparatus has an outer cylinder and a telescoping inner cylinder in the outer cylinder. The inner cylinder has at an end portion thereof a jet nozzle which can be shoved out of the outer cylinder. A first plunger is sealed about its periphery to the outer cylinder and is movable by pressure of washing liquid away from a second plunger. In this manner the inner cylinder is shoved out of the outer cylinder. When both cylinders are at their greatest spacing from one another they determine, together with the outer cylinder, a space which serves to receive a particular quantity of washing liquid. Thereafter, the second plunger is urged, by pressure of the washing liquid, toward the first plunger. This causes, after the opening of a valve in series with the jet nozzle, the washing liquid to flow through a passageway of the first plunger toward the jet nozzle.

U.S. Pat. No. 5,762,271 discloses a windshield washing system for a motor vehicle which moves a jet nozzle from an inward rest position to an outward working position by pressure applied to a cleaning liquid. A valve cover of a valve is moved, together with a nozzle support by the pressure of the cleaning liquid and holds a passageway of the nozzle support closed until the valve cover engages a fixed stop and the valve cover of the valve then opens. The stop is on a fixed shaft-shaped holding element which, in the rest position of the jet nozzle, extends into a receiving element. The receiving element is inserted into a passageway of the nozzle support and is sealed, by an inner side of the valve cover. When the jet nozzle is in its working position, cleaning liquid flows through a passage space between the receiving element and the nozzle support to the jet nozzle.

In a light cleaning device for a vehicle it is desirable to protect the device from dirt and other undesirable matter from penetrating therein, thereby reducing the chances of device malfunction. A cleaning device adapted to be used for different headlamp geometries and car/bumper shapes would also be advantageous. Furthermore it is desirable for the cleaning device to operate quickly and efficiently.

It is therefore an object of the present invention to provide a light cleaning device that is adapted to be dirt resistant, installable on a wide range of vehicles and capable of rapid liquid discharge. It is a further object of the present invention to provide a jet nozzle suited for emitting a liquid jet having a full section.

SUMMARY OF THE INVENTION

According to the present invention there is provided a vehicle light cleaning device (head lights or other) formed with a housing fixedly attached to the vehicles frame, e.g. a bumper, with a rinsing head displaceable between a retracted position wherein it is received within the frame, and a projecting, operative position such that it extends in front of the light and emits a jet of rinsing liquid. The arrangement of the invention is such that once initiated the housing of the device remains occupied with liquid readily available for instantaneously projecting and emitting a rinsing jet. Typically, one or more jet nozzles are provided and are angularly adjustable with respect to the rinsing head.

According to a first aspect of the invention there is provided a vehicle light cleaning device comprising an elongate housing formed with an inlet port connectable to a source of pressurized rinsing liquid, a rinsing head fitted with at least one jet nozzle and mounted at a distal end of a telescopically retractable hollow tube, said tube being normally retracted; a liquid flow path extending between said rinsing head and an inside space of the housing; a normally closed sealing assembly adapted to open the liquid flow path only responsive to full projection of the tube from the housing.

It is advantageous that the housing is fixable to a frame member of the vehicle by a joint facilitating adjusting the orientation of the housing with respect to the frame member in at least one of axial, pitch, yaw and roll degrees of freedom. According to a particular design, the joint comprises a spherical surface axially fixable over the housing and a corresponding bracket fixable to a frame portion of the vehicle and clampingly secured to the spherical surface.

Furthermore, the rinsing head may be formed with a cover member which at a retracted position of the device extends substantially flush with a surface of a frame member of the vehicle supporting said device. The cover may be fixed to the rinsing head in an adjustable manner so as to facilitate its positioning with respect to an aperture formed in the frame member, such that at the retracted position of the device the cover extends flush with a surface of the frame member.

According to a first specific embodiment the flow path is a cylindrical path extending between a tubular portion of the tube and the rinsing head and the sealing assembly comprises a plug-like portion formed at the distal end of a plunger, fitted for sealing said cylindrical path.

According to the first embodiment the sealing assembly comprises a plunger coaxially displaceable within the tube and formed at a distal end thereof with a sealing portion for sealing engagement of the flow path, and at a proximal end there is a lateral projection fitted for axial arresting by a stopper member extending adjacent a distal end of the housing, whereby only when the tube fully projects the sealing portion disengages so as to open the flow path.

Furthermore, the tube is normally biased to retract by a biasing spring bearing at one end thereof at a proximal end of the tube and at an opposite end thereof against a portion of the housing.

Also, the plunger is biased into sealing engagement of the flow path by a spring member extending between a proximal end of the tube and a proximal end of the plunger. Furthermore, the tube is axially displaceable and sealingly retained within the housing by a sealing packing.

According to a second embodiment of the invention the tube is coaxially received within a sleeve telescopically projectable from the housing and formed at a proximal end thereof with the liquid sealing assembly; said liquid sealing assembly comprising an aperture formed at a proximal end of the sleeve and sealable by a sealing plug radially displaceable between a normally closed position, and an open position where it radially disengages from the aperture responsive to full projection of the sleeve and the associated tube, to facilitate liquid flow from the housing into the tube.

The arrangement may be such that the sealing plug is retained in the closed position by a retention member displaceable over an inclined surface between a sealed position where it is substantially flush with an external surface of the sleeve, and an open position where it radially projects; and further the sealing assembly comprises a stopper member extending at a distal end of the housing, whereby upon full projection of the tube said stopper member arrests axial displacement of the sleeve resulting in displacement of the sealing plug along said inclined surface so as to radially displace into the open position.

The retention member may be an elastic band embracing the sealing plug and a portion of the sleeve.

According to a third embodiment of the invention, the tube accommodates an inner cylinder having an open proximal end and is formed at its distal end with a sealing member for sealing the flow path; said inner cylinder cooperating with an axially extending spring support member such that there is restricted axial displacement therebetween; a first coiled spring is articulated to the housing at a proximate end thereof with a distal end of the spring articulated to a distal end of the spring support; a stopper member is provided at a distal end of the housing for arresting a lateral projection of the inner cylinder, whereby upon complete projection of the tube from the housing the inner cylinder is arrested so as to disengage the sealing member from the flow path and open it.

The inner cylinder is axially biased away from the spring support member by a second spring member.

According to another aspect of the present invention there is provided a liquid jet nozzle for use with a vehicle light cleaning device, the jet nozzle comprising a housing and a jet forming member fitted therein; the housing being formed with a spherical portion swivellingly received within a corresponding rinsing head of the cleaning device, and a jet emitting portion; the jet forming member dividing the spherical portion of the housing dividing it into a liquid inlet chamber and a liquid swirl chamber, said liquid swirl chamber being in flow communication with the jet emitting portion, and wherein a liquid flow path extends between the liquid inlet chamber and the liquid swirl chamber, said liquid flow path comprising at least one tangential duct for directing liquid radially inwards into the swirl chamber. The at least one tangential duct extend from a substantially axial channel formed between the jet forming member and the spherical portion.

The housing may comprise a wall portion extending between the spherical portion and jet emitting portion. In such case, the wall portion may have a jet aperture, substantially axial, formed therein. The jet emitting portion may be formed with axially extending recesses.

Optionally, the jet forming member may include also one or more axial apertures. In such case, the liquid swirl chamber may also be in flow communication with the liquid inlet chamber also by the one or more axial apertures formed in the jet forming member. The jet forming member may be integral with or attached to the housing.

BRIEF DESCRIPTION OF THE DRAWINGS

In order to understand the invention and to see how it may be carried out in practice, several embodiments will now be described, by way of non-limiting examples only, with reference to the accompanying drawings, in which:

FIG. 7 is a section along line A-A in FIG. 1, illustrating the position of the liquid just before the piston valve impacts the stopper;

FIG. 8 is a section along line A-A in FIG. 1, illustrating the piston valve impacting the stopper and the subsequent flow path of the liquid;

FIGS. 21A-21E illustrate a jet nozzle according to an embodiment of the present invention, wherein:

FIG. 21A is front isometric view of the jet nozzle seen in FIG. 1;

FIG. 21B is rear isometric view of the jet nozzle;

FIG. 21C is section along line J-J in FIG. 21A;

FIG. 21D is section along line P-P in FIG. 21A

FIG. 21E is an exploded isometric view of the jet nozzle;

FIGS. 23A-23C illustrate a further embodiment of a jet forming nozzle according to the invention, wherein:

FIG. 23A is an isometric view of the nozzle, made transparent for visualizing its configuration;

FIG. 23B is a front isometric view of the jet forming member of the nozzle in FIG. 23A; and FIG. 23C is an isometric view of the nozzle, longitudinally sectioned.

DETAILED DESCRIPTION OF EXEMPLARY EMBODIMENTS

Figure 1:
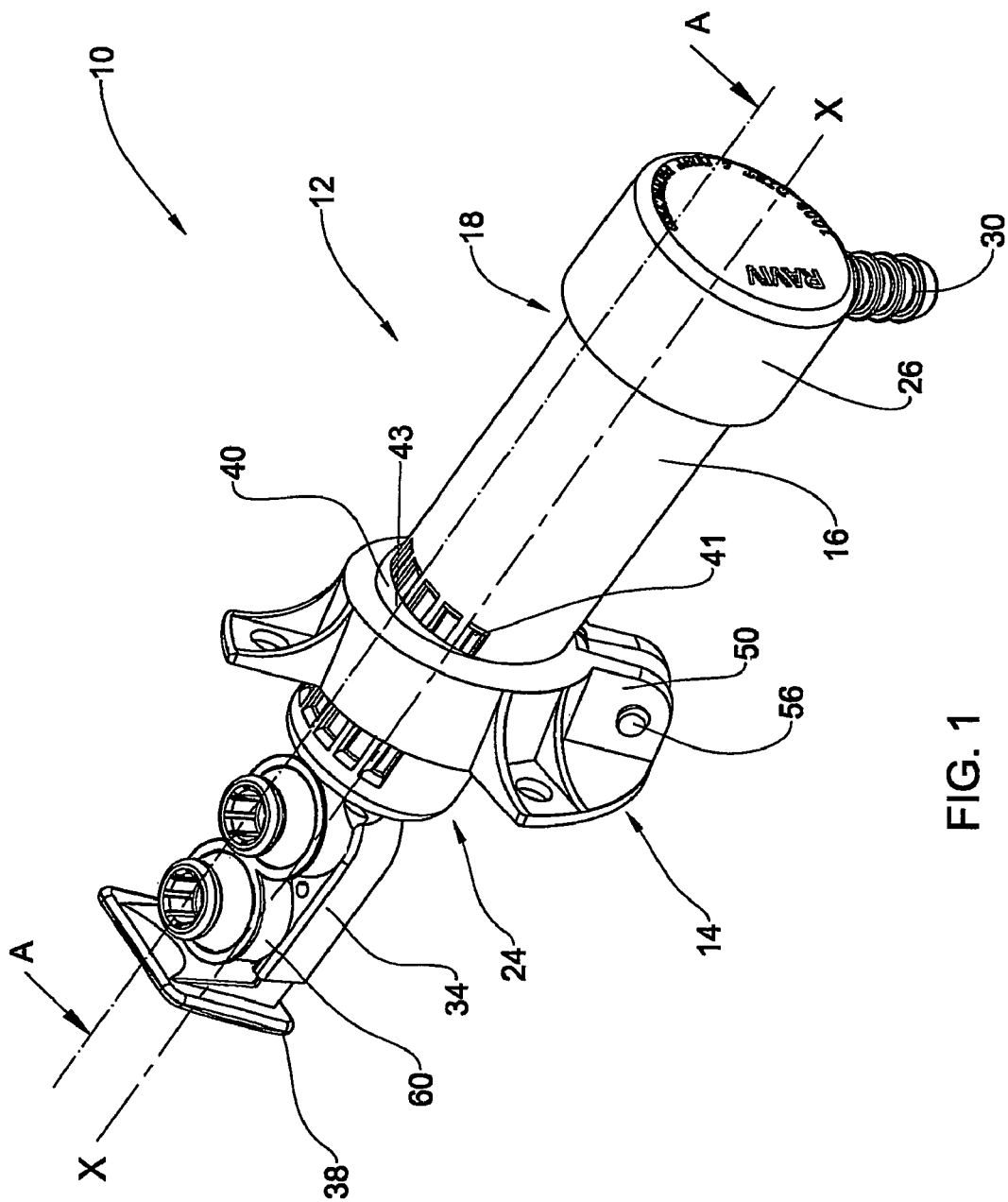
FIG. 1 is a perspective view of the cleaning device according to a first embodiment of the present invention.
Figure 4:
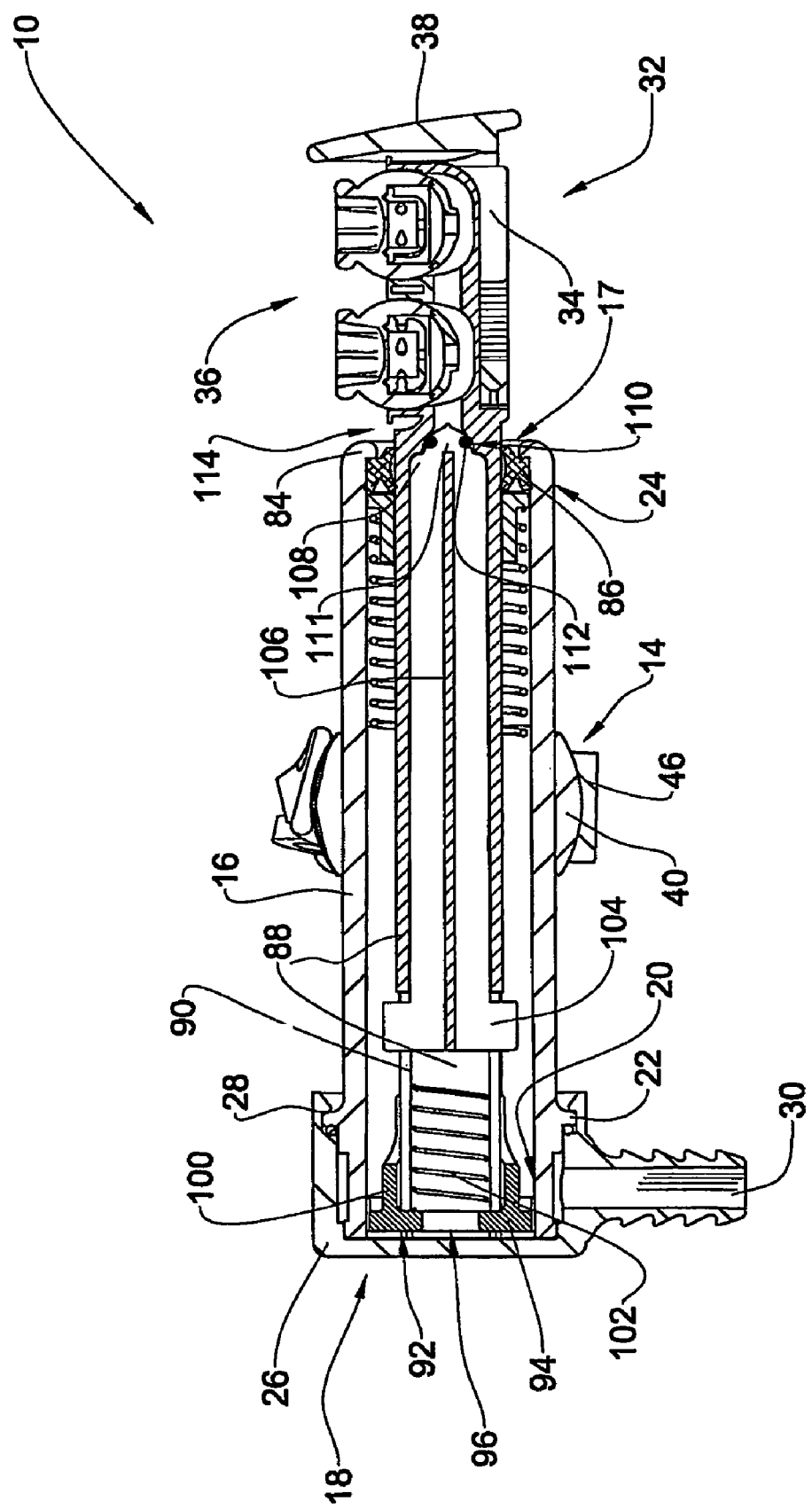
FIG. 4 is a section along line A-A in FIG. 1.

Attention is first directed to FIGS. 1 and 4 of the drawings illustrating a light cleaning device in accordance with a first embodiment of the present invention generally designated 10. The cleaning device 10 having a longitudinal axis X-X comprises a spherical bracket 14 and a jet carrier 12 mounted within the spherical bracket 14.

The jet carrier 12 further comprises a cylindrically-shaped sleeve 16 has an open upper end 17, and has a lower end 18 fitted with a bottom cap 26 which is snap fitted to the sleeve 16 in a liquid-tight manner by a clasp-like lip 28 snappingly fastened to a rib 22. Cap 26 comprises a liquid inlet port 30 being in flow communication with the inner space of the cylindrically-shaped sleeve 16. Inlet port 30 is externally ribbed and is connectable, for example, to a pump (not shown) via a hydraulic pipe (not shown) for inflow of liquid.

The jet carrier 12 further comprises a liquid discharge mechanism generally designated 32, slidably engaged within the sleeve 16 capable of telescopic extension from the jet carrier 12 (FIGS. 7 and 8) and retractable to an initial position (FIGS. 1 and 4). The liquid discharge mechanism 32 is in liquid communication with the sleeve 16 and comprises a generally U-shaped head 34 that in turn has mounted thereon a jet nozzle system 36 for rapid discharge of liquid, and a height adjustable cover 38, extending over liquid discharge mechanism 32, for adjusting an matching to different bumper configurations.

Generally, the cleaning device 10 operates as follows:

At an initial position, upon activation of the liquid pump (not shown) liquid is pressurized from a liquid reservoir via suitable piping (not shown) into the inlet port 30 and subsequently enters the sleeve 16 and occupies its entire volume it. The liquid in the sleeve 16 causes the liquid discharge mechanism 32 to project telescopically upwards through the bumper and subsequently to discharge a jet spray of liquid, from the sleeve 16, via the nozzle system 36 onto a desired objective such as a headlamp (not shown).

When the pump ceases to provide pressurized liquid, whether by manual or automated command, the jet spray stops and the liquid discharge mechanism 32 retracts into the sleeve 16, the mechanics of which to be explained in further detail hereinafter.

The cover 38 correspondingly reverting to a substantially flush position with the bumper. It is important to note that even though the liquid is not termed "pressurized" the pressure of the liquid in the system is always greater than air thereby stopping air from the atmosphere and dirt entering the jet carrier 12. A detailed description of the device will follow hereinafter.

The cleaning device 10 may be installed to a bumper of a vehicle or to other body parts thereof, such that the device 10 is fully received within a suitable cavity and substantially does not interfere with the external shape of the vehicle. However, device is mounted such that the adjustable cover 38 is substantially flush with the respective vehicle portion bearing the device. As will be explained hereinafter in more detail (with reference to FIG. 2) the device comprises a bracket system for fixing it at an appropriate position within the respective cavity.

The cleaning device 10 of the present invention is, in this example, installed within a bumper bar (not shown) of a vehicle by fastening the spherical bracket 14 thereto using screws (not shown). A top portion of the bumper (not shown) comprises a cut-out portion of sufficient size so as to accommodate passage of the cross section of the nozzle portion of the first liquid discharge mechanism 32. When the first liquid discharge mechanism 32 is in the retracted position the cover 38 is flush with the cut-out portion (not shown), aided by a height adjustable design to be described hereinafter, preventing penetration of undesirable substances into the bumper and camouflaging the cleaning device 10.

Figure 2:
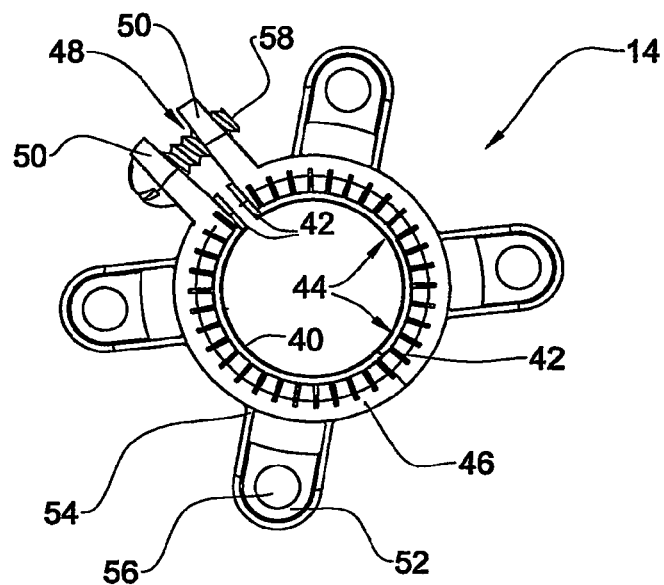
FIG. 2 is a bottom view of a bracket assembly seen in FIG. 1.

Further reference is made also to FIG. 2 illustrating the spherical bracket which comprises an inner ring 40 formed with a spherical outer face 43 and a cylindrical inside surface that is slidably engaged with the sleeve 16. A plurality of radial ribs 41 are formed on a portion of the sleeve 16 with corresponding engagement ribs 44 formed on the inside surface of the inner ring 40, such that rotation about the longitudinal axis of the device is eliminated and whereby axial displacement of the device about a longitudinal axis thereof is adjustable.

The outer ring 46 has a discontinuity 48 at one portion, with two lateral flanges 50 formed at the edges of the discontinuity 48. The outer ring 46 may be clampingly secured over the inner ring 40 by a fastener 58 tightening the outer ring 46 over the inner ring 40, thus fixing the relative orientation therebetween, as far as pitch, yaw and roll with respect to the longitudinal axis of the device. Once the outer ring 46 is clampingly tightened, the sleeve 16 is no longer displaceable with respect to the bracing bracket 14, which in turn is fixedly secured to a body portion of the vehicle.

The outer ring 46 further comprises a several lateral projections 52, each formed with an aperture 56 adapted to accommodate a fastening device such as a screw, a rivet or bolt for fixedly securing to the vehicle's body portion. In the present example, the bracket 14 is adapted to be fastened to an inner surface of a top portion of a bumper (not shown) using additional screws (not shown) that are disposed through the lateral projections 52. The fastening of the spherical bracket 14 to the top portion of the bumper, in this example, orients the jet carrier 12 in a substantially upright position with respect to the vertical axis. The jet carrier 12 is therefore extendable along the vertical axis, due to the telescopic capability of the first liquid discharge mechanism 32, and rotatable about the vertical axis. However it is appreciated that other than vertical positioning of the jet cleaner are possible, depending on the geometry of the vehicle body/bumper and the head lights.

Figure 3:
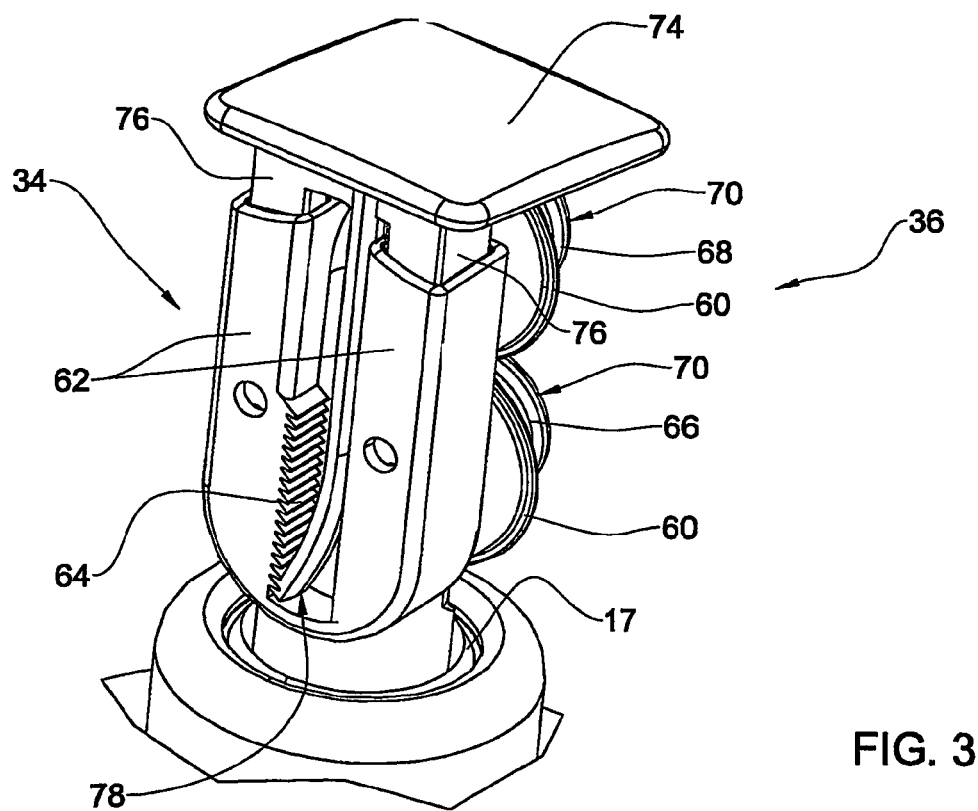
FIG. 3 is a rear perspective view of the liquid discharge mechanism seen in FIG. 1.

With further reference now being made also to FIG. 3 the U-shaped head 34 of the liquid discharge mechanism 32 is illustrated. The U-shaped head 34 comprises a jet nozzle system 36 which in the present example comprises two vertically extending cylindrical receptacles 60 formed on the U-shaped head 34, accommodating a first nozzle 66 and a second nozzle 68 respectively. The first and second nozzles are comprise a spheric portion 70 mounted within receptacles 60, such that the jet orientation may be adjusted.

Two straight upper members 62 of the U-shape head 34 are hollow and are adapted to slidably receive corresponding members of the height adjustable cover 38. Between the two straight upper members 62 there is a tooth-like rack surface 64.

The height adjustable cover 38 comprises a substantially flat top portion 74 and two rigid support members 76 extending downwardly therefrom and being slidably receivable within the U-shaped head 34 as mentioned above. The cover 38 further has formed therein a fastener in the form of a hook 78 disposed between the two support members 76 of the U-shaped head 34 and being biased into the grooves of the tooth-like rack surface 64 of head 34, thereby anchoring the cover 38 at a desired height.

The height of the cover 38 may be adjusted by applying a force on the hook 78 in the opposite direction to the stated bias and a force down on the cover 38.

As can further be seen in FIGS. 4 and 5, the sleeve 16 further comprises a plurality of axial projections 80 axially extending along at least a portion of the inner surface 82 thereof, the purpose of which to be explained hereinafter, and an inwardly projecting lip 84 (FIG. 4) adjacent to the open upper end 24, retaining a first sealing ring 86 mounted at a top end of a telescopic cylindrical body 88, inside the upper end of the sleeve 16. The first sealing ring 86 sealingly encircles a portion of the cylindrical body 88 in a close fit without restricting its axial motion. The first sealing ring 86 further serves to restrict the passage of unwanted substances into and out of the sleeve 16.

The cylindrical body 88 comprises two axially extending slots 90 formed at a lower end thereof (see FIGS. 4 and 5) and is fitted with a base generally designated 92 which is slidably received with the sleeve 16. The base 92 has an annular floor 94 with a concentric aperture 96 formed therein. The annular floor 94 has a plurality of axial depressions 98 corresponding with the axial projections 80 on the sleeve 16.

Extending upwardly from the annular floor 94 is a tubular section 100 formed therein. The tubular section 100 and annular floor 94 form a seat for a lower end of the cylindrical body 88 which is fitted therein. The lower end of the cylindrical body 88 further comprises a first helical spring 102 mounted therein. The first helical spring 102 is disposed within the cylindrical body 88 and engages a plunger 104 also axially disposed within the cylindrical body 88.

The plunger 104, is slidably engaged with the cylindrical body 88. The top end of the plunger 104 narrows at a shoulder 108 thereof to a cone-shaped plug 110 (also seen in FIGS. 7 and 8). A middle section 111 of the plug 110 has a reduced diameter to accommodate a sealing O-ring 112 (FIGS. 4, 7 and 8). The outer perimeter of the plug 110 corresponds with dimensions of the internal portion of the first liquid discharge mechanism 32 at the junction 114 between the cylindrical body 88 and the U-shaped head 34, for sealing thereof, as will be discussed hereinafter.

Referring now to FIG. 7, the first helical spring 102 biases the bottom end of the plunger 104 upwardly causing the normal position of the plug 110 being sealingly disposed inside the junction 114.

Figure 5:
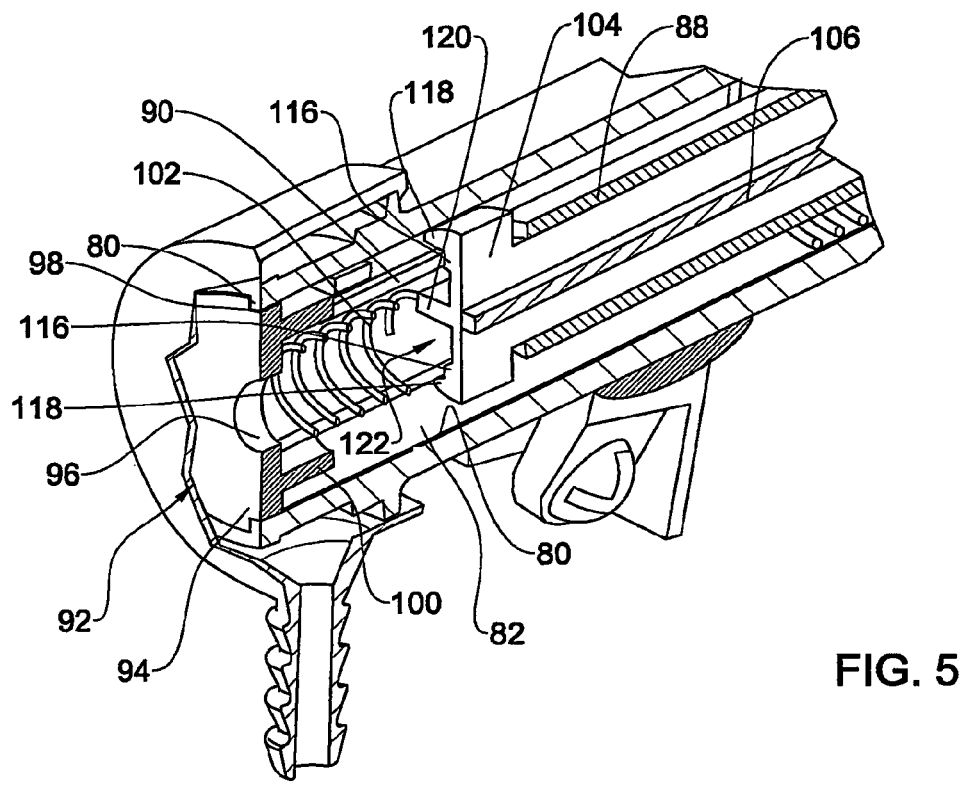
FIG. 5 is a sectioned perspective view of a lower portion of the cleaning device taken along section line A-A in FIG. 1.

Reverting to FIG. 5, the cross-section of the bottom end of the plunger 104 resembles a t-shape with the cross rib of the t having two extreme edges 116 with downwardly oriented lips 118. The central downward rib 120 and the central upward rib 106 of the t causes a division of the cylindrical body 88 into four channels 122. The lips 118 project outwardly from the slots in the cylindrical body 88 and arrest the plunger 104 from performing non-axial motion. The lips 118 extend sufficiently from the cylindrical body 88 to impact an L-like mechanical stopper 122 (FIG. 6) also positioned on the periphery of the cylindrical body 88.

The mechanical stopper 122 is in the form of a ring disposed between cylindrical body 88 and the sleeve 16 and furthermore, is adjacent to the open upper end 24 of the sleeve

16. The mechanical stopper 122 is restricted from exiting the sleeve 16 due to the first sealing ring 86. Notably, the stopper 122 does not restrict the sliding motion of the cylindrical body 88. An annular lateral projection 124 formed at a top portion of the stopper 122 serves as a seat for a second helical spring 126.

The second helical spring 126 has a top end 126A bearing against the lateral projection 124 of the stopper 122, and a bottom end 126B bearing against the base 92. The second helical spring biases the base 92 and hence the cylindrical body 88 downwardly causing them to normally rest at the lower end of the sleeve 16.

Detailed Operation of the Cleaning Device 10

Once initiated, pressurized liquid will remain in the jet carrier 12 also if the pump (not shown) is not being activated. Upon supplying liquid to the jet carrier 12 the liquid will accesses and occupy all spaces within the sleeve 16. The first helical spring 102 biases the plunger 104 upwards, thus forcing the plug 110 into the junction 114. The O-ring 112 serves to seal the junction 114 from unwanted liquid flow therethrough. The liquid also fills the cylindrical body 88 including the four channels 122 until it reaches the junction 114 at which the plug 110 prohibits the liquid flow into the U-shaped head 34.

Figure 6:
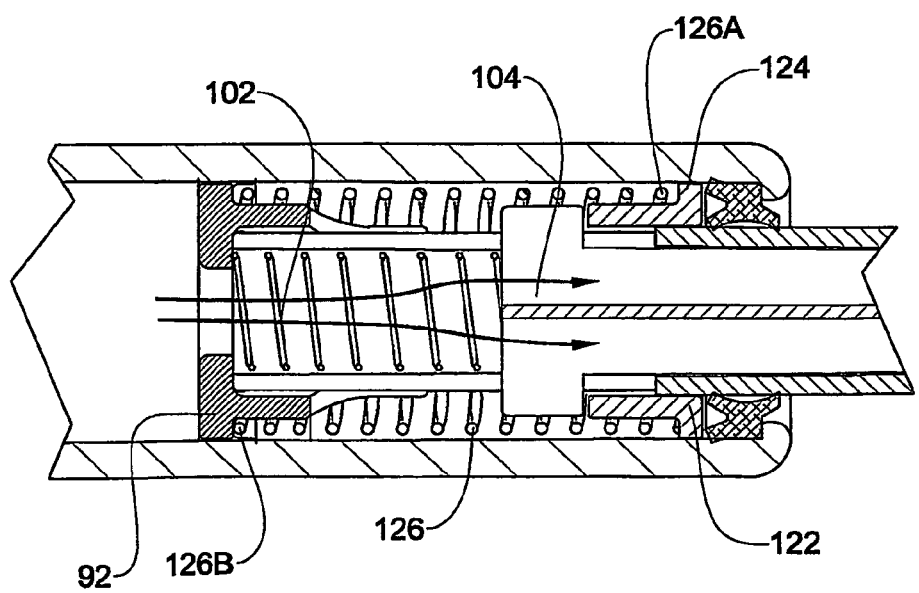
FIG. 6 is a section along line A-A in FIG. 1, illustrating the piston valve impacting the stopper and the subsequent flow path of the liquid.

When pressurized liquid is provided to the jet carrier 12 (by the pump, not shown) the already waterlogged device is pressurized and in turn it propels the liquid discharge mechanism 32 to telescopically extend upwardly from the sleeve 16 (FIG. 7) compressing the second helical spring 126. The upward displacement of the cylindrical body 88 continues even after the plunger 104 halts upon impacting the mechanical stopper 122 (FIG. 6). The net result of the relatively stationary plunger 104 and the advancing cylindrical body 88 causes the junction 114 to be unplugged (FIG. 8) and allows the liquid (indicated by arrows) to enter U-shaped discharge mechanism (head) 34 and subsequently the nozzles which releases a jet spray against the light shield (not shown).

When the pressurized liquid is no longer supplied to the jet carrier 12 the first helical spring 102 returns the plunger 104 to the initial position once again plugging the junction 114 and the second helical spring 126 forces the first liquid discharge mechanism 32 to revert to its initial lower/retracted position (FIGS. 1 and 4). However, as already mentioned hereinbefore, at the retracted position all the components of the device 10 are filled with water, retaining it readily available for a rapid cycle of operation.

A second embodiment of a light cleaning device according to the present invention will now be described with reference to FIGS. 9 to 15 of the drawings.

Figure 9:
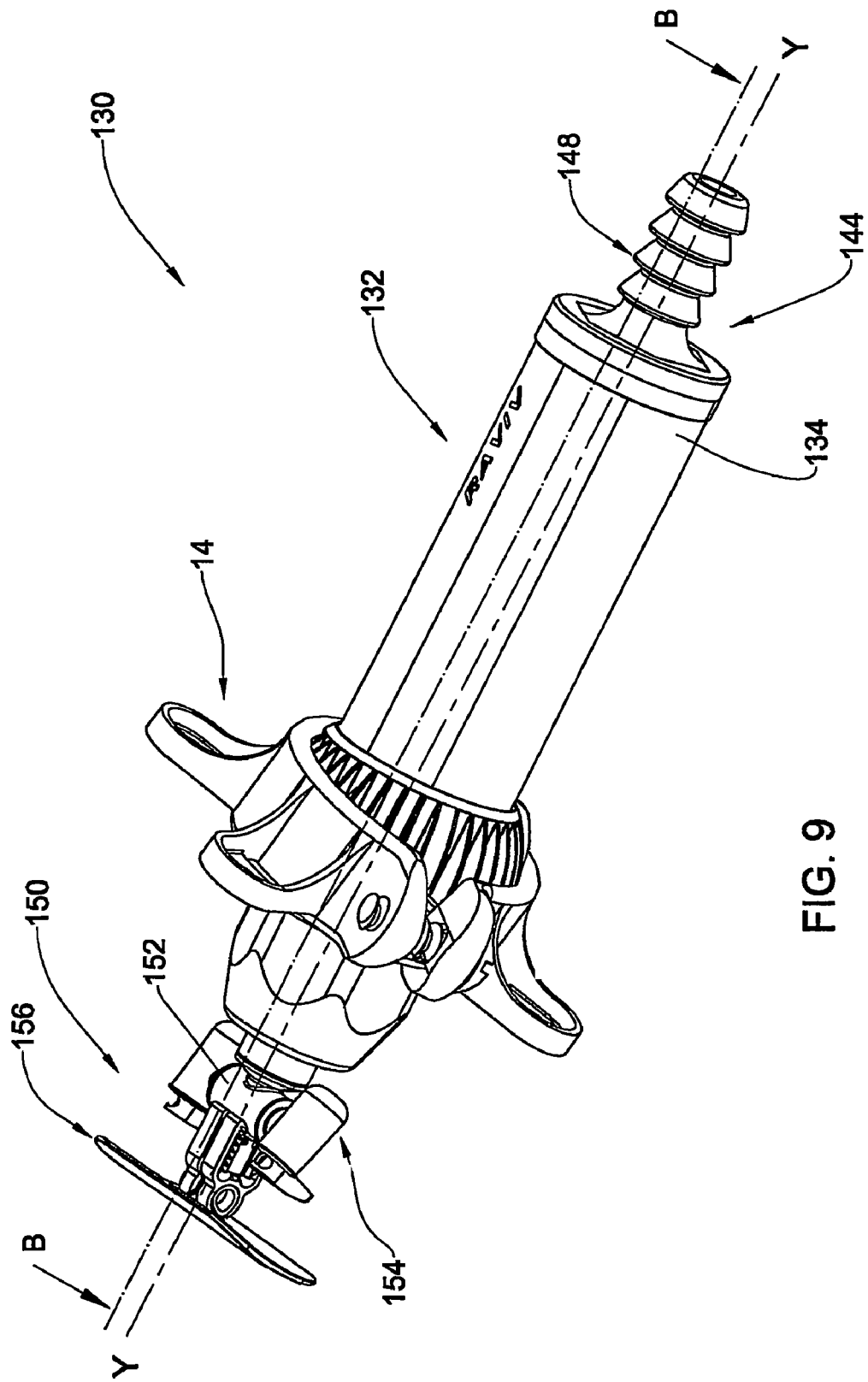
FIG. 9 is a perspective view of the cleaning device according to a second embodiment of the present invention.
Figure 10:
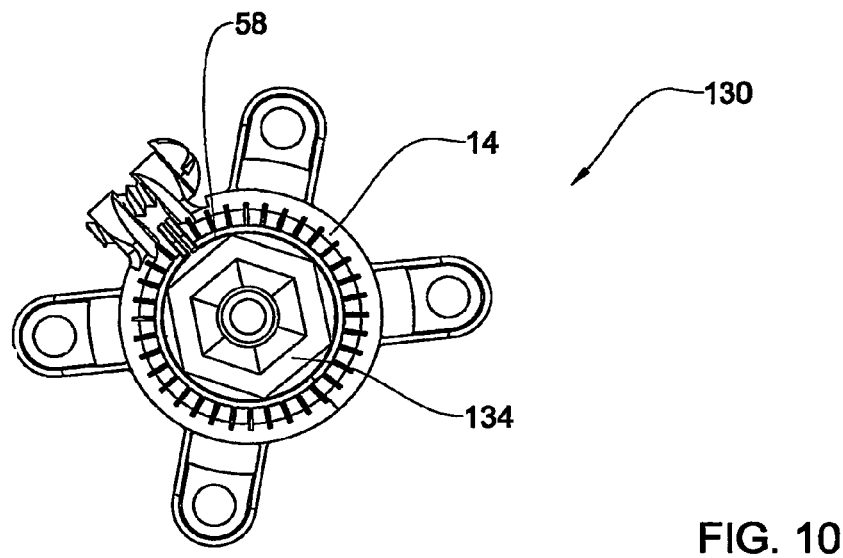
FIG. 10 is a bottom view of the cleaning device shown in FIG. 9.
Figure 12:
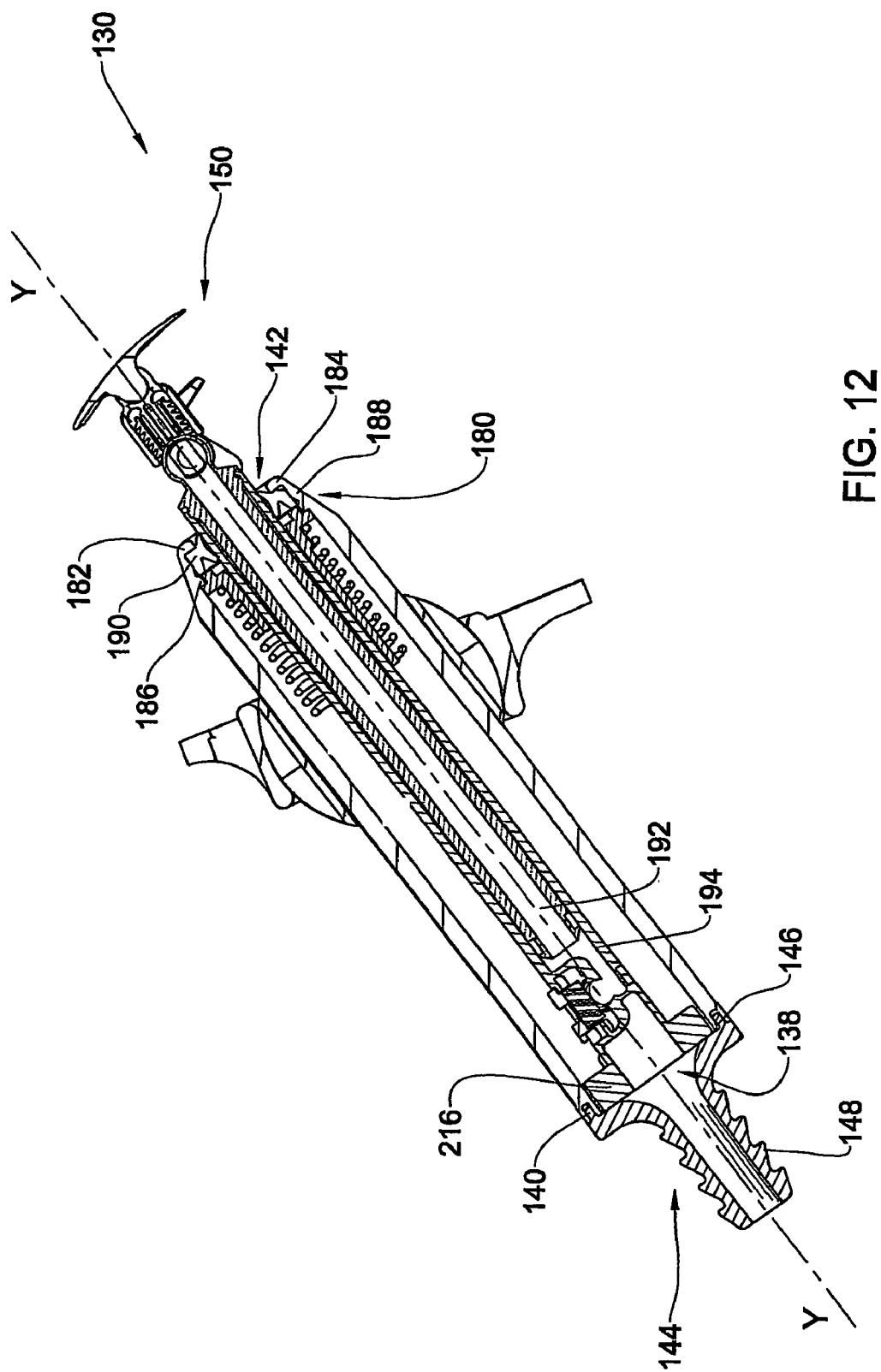
FIG. 12 is a section along line B-B in FIG. 9.

Attention is first directed to FIGS. 9 and 12 illustrating the light cleaning device in accordance with a second embodiment of the present invention generally designated 130. The cleaning device 130 having a longitudinal axis Y-Y comprises a spherical bracket 14 of similar design as that disclosed in connection with the previous embodiment and reference is made thereto. However, the jet carrier 132 mounted within the spherical bracket 14 has a hexagonal cross-section. In FIG. 10 a bottom view of the second embodiment 130 is illustrated. The spherical bracket 14 is noted to be identical to that described above and is slidably engaged with the hexagonal sleeve 134.

Figure 11:
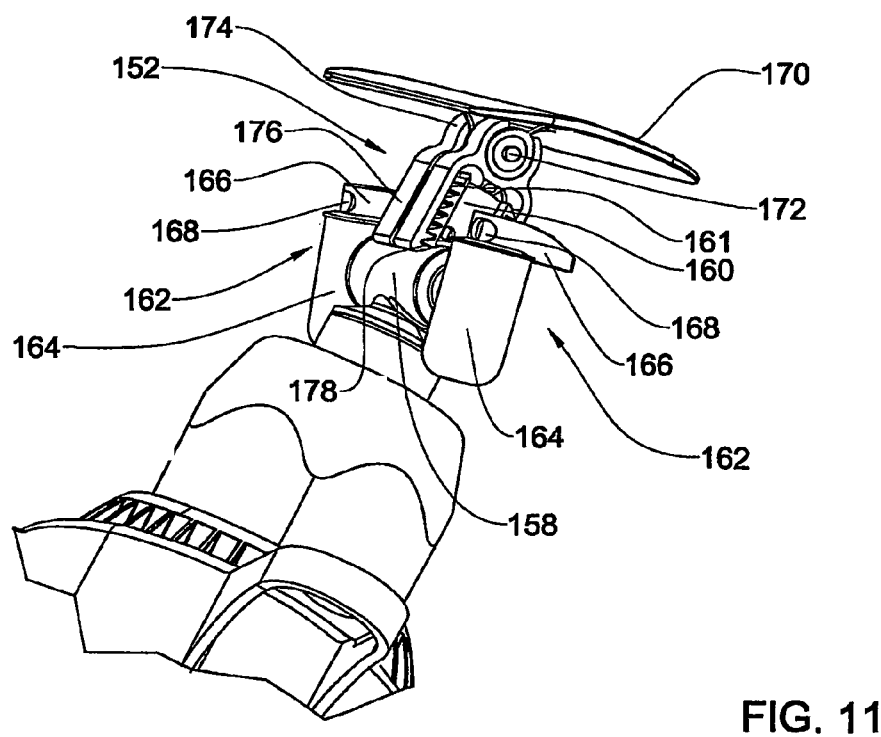
FIG. 11 is a perspective view of the liquid discharge mechanism seen in FIG. 9.

The hexagonal jet carrier 132 further comprises a hexagonal-shaped sleeve 134 having an open upper end 142, an open lower end 138 which is sealingly closed by a hexagonal cap 144 (e.g. articulated thereto by an annular projection 146 in the hexagonal cap 144 being pressure fitted to the circular depression 140 in the hexagonal sleeve 134, or heat welded, ultrasonic welded, screw fastened, etc.). The cap 144 further comprises a ribbed vertical inlet port 148 connectable, for example, to a pump via a hydraulic pipe (both not shown) for inflow of liquid. The hexagonal jet carrier 132 further comprises a liquid discharge mechanism generally designated 150 slidably engaged with the sleeve 134 capable of telescopic extension from the hexagonal jet carrier 132 (FIG. 13) and retractable to an initial position (FIGS. 9, 11 and 12). The liquid discharge mechanism 150 is in liquid communication with the interior of the hexagonal sleeve 134 and comprises an upside-down T-shaped head 152 that in turn has mounted thereon a jet nozzle system 154 for rapid discharge of liquid, and a height adjustable and pivotal cover 156, extending over the liquid discharge mechanism 150.

The jet lamp cleaner according to the second embodiment 130 may be installed within a bumper bar (not shown) of a vehicle and operate in a manner similar to that described above regarding the general operation of the first embodiment 10, however, there are differences in the internal structure and hence detailed operation of the second embodiment 130, which will be described hereinafter.

The T-shaped head 152 comprises a cylinder 158 traversing the longitudinal axis of the jet cleaner and extending substantially horizontal. The cylinder 158 is open at both ends thereof and is in liquid communication with the remainder of the liquid discharge mechanism 150, and a longitudinally extending cylinder 160, having a tooth-like rack surface 161 and being open at a top end for mounting of the rotatable cover 156 thereon.

As can be seen in FIG. 11, the horizontal cylinder 158 is needed for operation of the jet nozzle system 154 which in the present example comprises two rotational nozzles 162, mounted on each side of the horizontal cylinder 158 and in liquid communication therewith. Each rotational nozzle 162 comprises a first rotatable portion 164, rotatably fitted to an open end of the horizontal cylinder 158 and in liquid communication therewith. The first rotational portion 164 is adapted to pitch about the vertical axis and has a second rotational portion 166 mounted thereon and being in liquid communication with the first rotational portion 164. The second rotational portion 166 is adapted to yaw about the vertical axis, and comprises an outlet 168 for releasing a jet spray.

As stated above the vertical cylinder 160 has the rotatable cover mounted thereon comprising a substantially flat cover portion 170 having a flange 172 formed therein. The flange 172 serves to rotatably join the cover portion 170 to a mounting unit 174. The mounting unit has internal arms (not shown) that are inserted into the vertical cylinder 160, and external arms 176 that are biased against the tooth-like rack surface 161 of the vertical cylinder 160. At the extreme edges of the external arms there are tooth-like projections 178 that slot into the tooth-like rack surface 161 to which they are biased against.

The height of the rotatable cover 156 may be adjusted by applying a force on the external arms 176 in the opposite direction to the stated bias and a force either up or down on the rotatable cover 156. The inclination of the cover portion 170 and/or rotational nozzles 162 may also be adjusted by applying a small force to a surface thereof.

Figure 13:
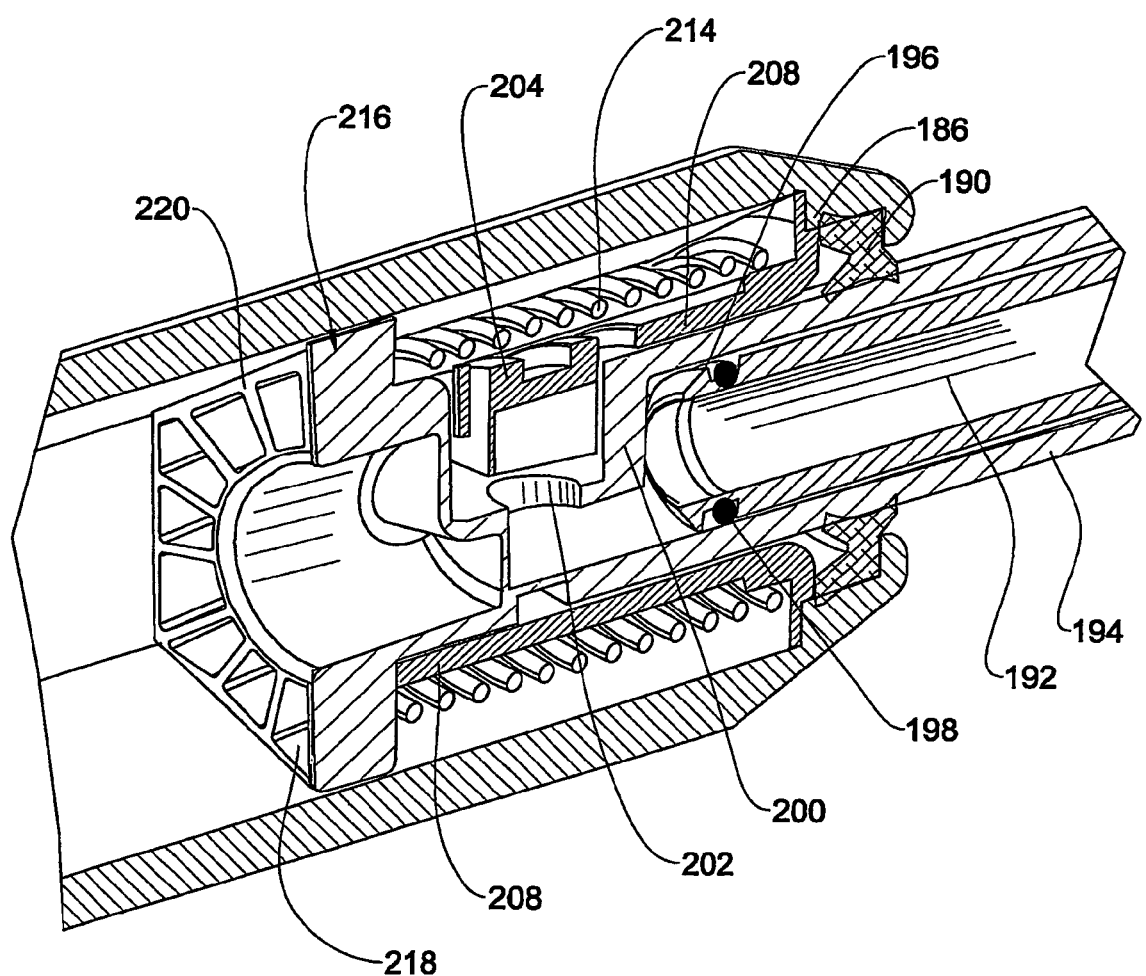
FIG. 13 is a perspective view of an upper portion of the cleaning device taken along section line B-B in FIG. 9, illustrating the valve translated radially outwardly.

Additionally, the hexagonal sleeve 134 has an inwardly slanted top end 180 comprising a first inward projection 182, at a shoulder thereof 184, and a second inward projection 186, at a middle portion of the slant 188 (FIGS. 12 and 13).

The first inward projection 182 ensures that a sealing ring 190 mounted inside the inward slanted top end 180 is unable to exit the hexagonal sleeve 134. The sealing ring 190 encircles a portion of the second liquid discharge mechanism 150 in a close fit relation, however without restricting its axial motion. The sealing ring 190 further serves to restrict the passage of unwanted substances into and out of the hexagonal sleeve 134.

In the current illustration the T-shaped head 152 can be seen to be formed above a cylinder 192 telescopically received inside a cylinder housing 194. The cylinder 192 comprises adjacent a bottom end thereof a circular groove 196 on which is mounted a second sealing ring 198 (FIG. 13). The second sealing ring 198 prevents liquid from below entering the gap between the cylinder 192 and the cylinder housing 194.

Further noticed in FIG. 13, the cylinder housing 194 is formed with an internal shoulder 200 upon which the cylinder 192 is seated. Formed within a lower portion of the internal shoulder 200 is an inlet aperture 202. The inlet aperture 202 is normally engaged by a radial valve mechanism 204.

Figure 14:
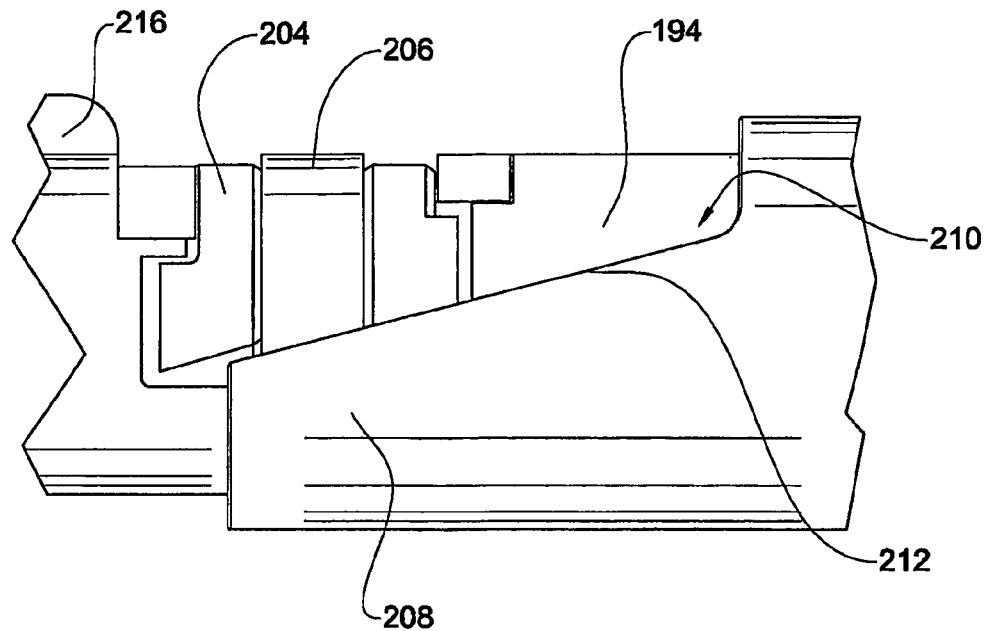
FIG. 14 is a schematic view of selected components of the second embodiment showing the piston valve opening, cam mechanism.

Referring now to FIGS. 13 and 14, the radial valve 204 is biased radially inwardly against the cylinder housing 194 by a resilient band 206 (not seen in FIGS. 12 and 13 however shown in FIG. 14) thus sealing the inlet aperture 202. Furthermore, the radial valve 204 is adapted to slidably engage a cylindrical cam 208.

The cam 208 is adapted to be mounted on the second inward projection 186 and further secured by the second sealing ring 190. The cam 208 further comprises an expanding slot 210 that expands as at an increasing distance from the second inward projection 186. The expanding slot has an inclined rim 212 upon which the radial valve 204 may slidably engage the cam 208. The cam 208 further serves as a seat for a third compressed helical spring 214 which is mounted thereon. The helical spring is adapted to bias the cylinder housing 194 downwardly by engaging a lower portion 216 thereof.

The lower portion 216 has a plurality of quadrilateral apertures 218 formed therein. The quadrilateral apertures 218 facilitates liquid communication from inside the hexagonal sleeve 134 below the lower portion 216 to the area between the hexagonal sleeve 134 inner periphery and the cylinder housing 194. It should be noted that the periphery of the lower portion 216 is formed in a hexagonal shape 220 that arrests non axial motion within the hexagonal sleeve 134.

Detailed Operation of the Cleaning Device 130

Upon initializing the jet cleaner, liquid will enter the hexagonal jet carrier 132 via inlet port 148 and will remain in the jet carrier also if the pump (not shown) is not being activated. Upon supplying liquid to the jet carrier the liquid will accesses and occupy all spaces within the hexagonal sleeve, with the exception of the cylinder 192 to which liquid communication via the inlet aperture 202 is restricted by the position of the radial valve 204.

Figure 15:
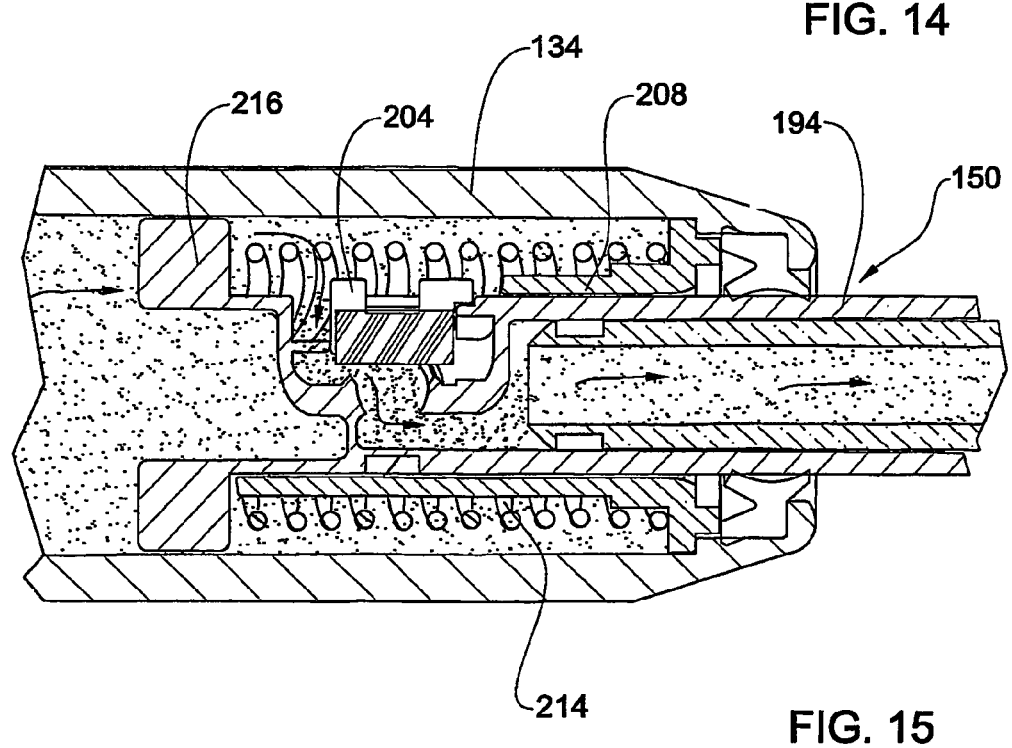
FIG. 15 is a section along line B-B in FIG. 9 of the upper portion of the cleaning device, illustrating the valve disposed in a outer radial position.

Referring now to FIG. 15, when pressurized liquid is provided to the hexagonal jet carrier 132 the already waterlogged hexagonal sleeve 134 propels the second liquid discharge mechanism 150 to telescopically extend upwardly from the hexagonal sleeve 134 compressing the third helical spring 214. The upward displacement of the cylinder housing 194 thrusts the radial valve 204 onto the inclined rim 212 (see FIG. 14) of the cam 208. The cam 208 thus causes an upward motion and outward motion of the radial valve 204, distending the resilient band 206, allowing liquid (indicated by arrows) to access the cylinder 192 via the inlet aperture 202 and subsequently the second jet nozzle system 154 releasing a jet spray (not shown) on the target.

When the pressurized liquid is no longer supplied to the hexagonal jet carrier 132 the third helical spring 214 returns the second liquid discharge mechanism 150 to the initial position once again. Due to the downwards motion the valve 204 disassociates from the inclined rim 212 allowing the resilient spring force it to move in an inwardly radial motion consequently plugging the inlet aperture 202 and ceasing the liquid supply to the jet spray.

Further attention is now directed to FIGS. 16 through 18C directed to a cleaning device in accordance with a third embodiment of the present invention generally designated 240. The device 240 has in principal components similar to those disclosed in connection with previous embodiments namely a housing in the form of sleeve 244 fitted with an inlet port 246 and a circle bracket support assembly 250.

Coaxially received within the sleeve 244, there is a cylindrical body 252 having an open proximal end at 254 and at its distal end there is a liquid discharge mechanism generally designated 258 being substantially similar to that disclosed in connection with the first embodiment (see for example FIGS. 1, 3 and 4). A distal, top end of the cylindrical body 252 is formed with a narrow shoulder portion 260 (resembling the arrangement disclosed in connection with said first embodiment). It is further noticed that the cylindrical body 252 is axially displaceable with respect to the cylindrical sleeve 244 whilst a pair of retention and sealing rings 264 and 266 are provided to facilitate such axial displacement in a sealed manner and with close fit, though without restricting such axial displacement.

The sleeved tube 244 is formed at its inside face near the distal end with an inwardly projecting stopper portion 247 (FIG. 17C) for arresting axial displacement of an inner segmented cylinder as will be explained herein after.

Coaxially and slidingly received within the cylindrical body 252, there is an inner cylinder 270, axially segmented as noticeable in FIGS. 17C, 18C, 19A and 19C. The inner segmented cylinder 270 cooperates with an alternatingly segmented spring support 275, such that in conjunction the two segmented cylinders form a cylinder as noticeable in FIGS. 17C and 18C and best in FIG. 19C). The spring support 275 is normally retracted within the sleeve tube 24 by means of a major retracting coiled spring 268 fixedly anchored to the bottom, proximal end of the sleeve tube 244 by means of a hooked arm 271 anchored to a spring support pin 274 (which in turn is fixed to the sleeve 244), with a top, distal end 276 of the coiled spring 268, being anchored to a integral pin 279 at a top end of the spring support 275.

Figure 17A:
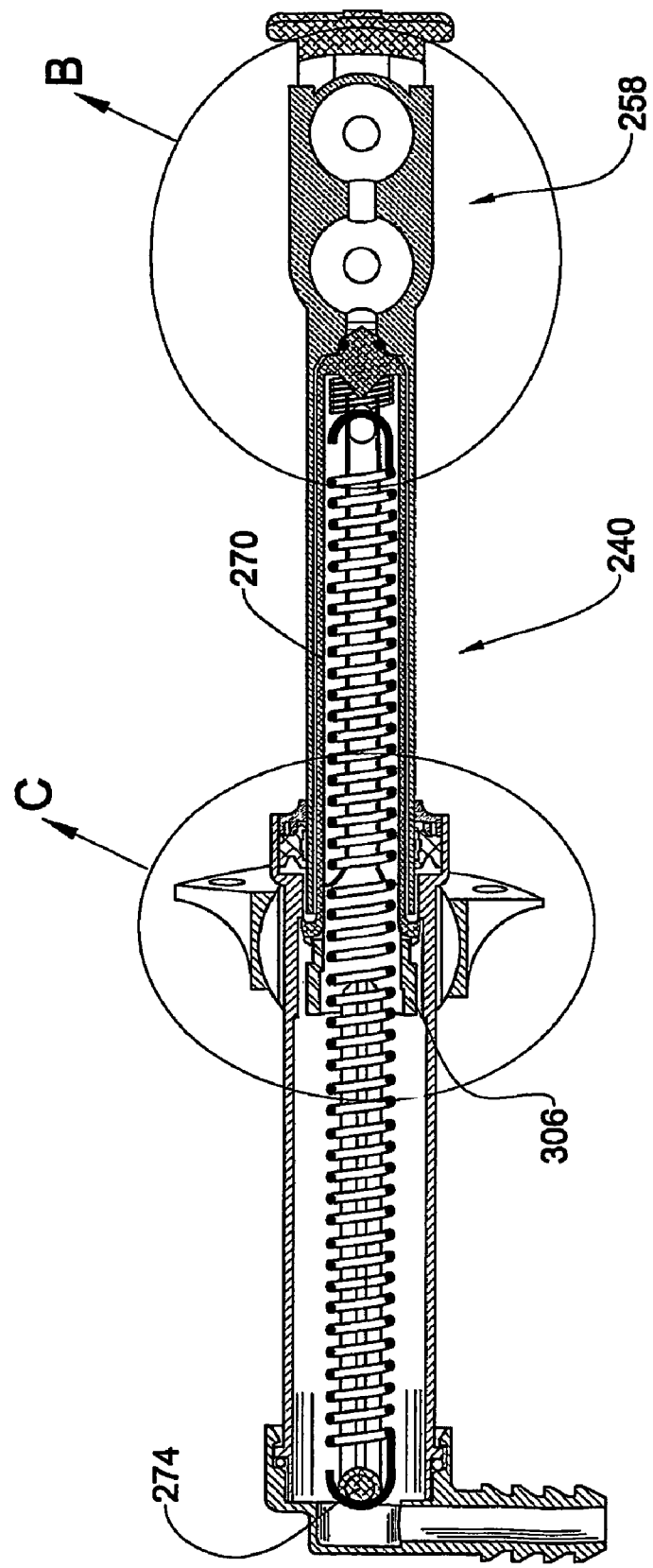
FIG. 17A is a section illustrating the device in its fully extended position though sealed.
Figure 17B:
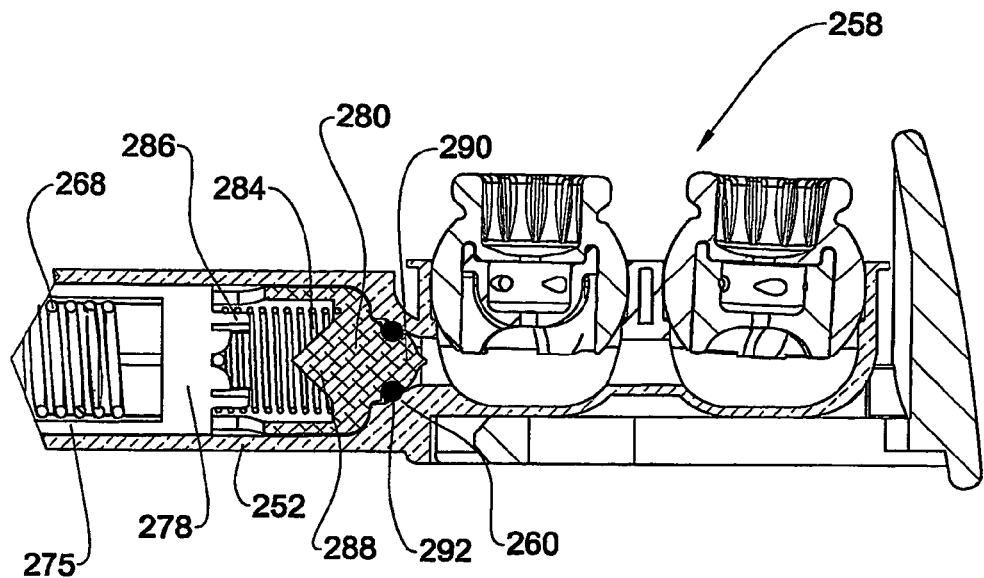
FIG. 17B is an enlargement of the portion marked B in FIG. 17A, the device rotated by 90°.
Figure 17C:
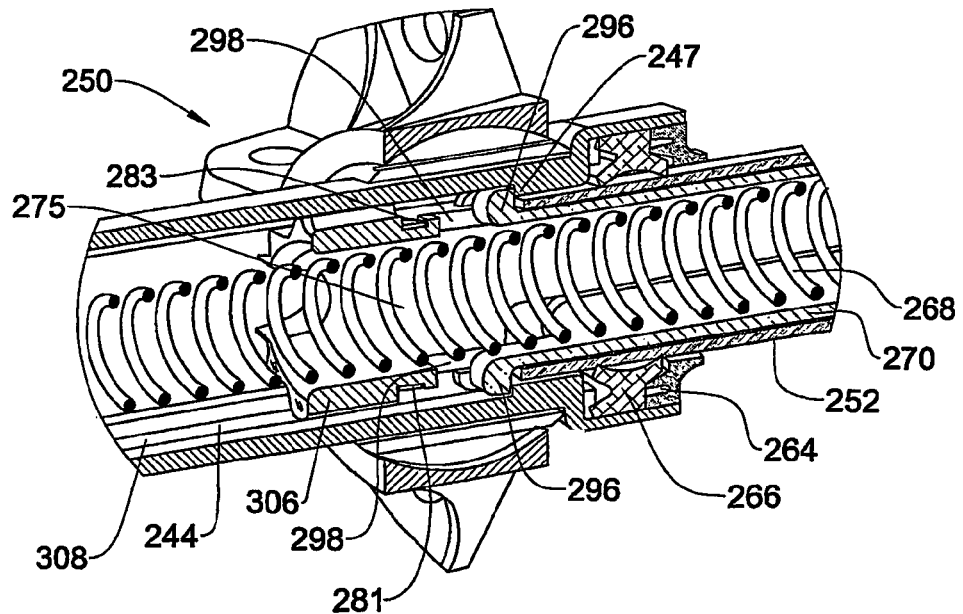
FIG. 17C is an enlargement of the portion marked C in FIG. 17A.
Figure 18A:
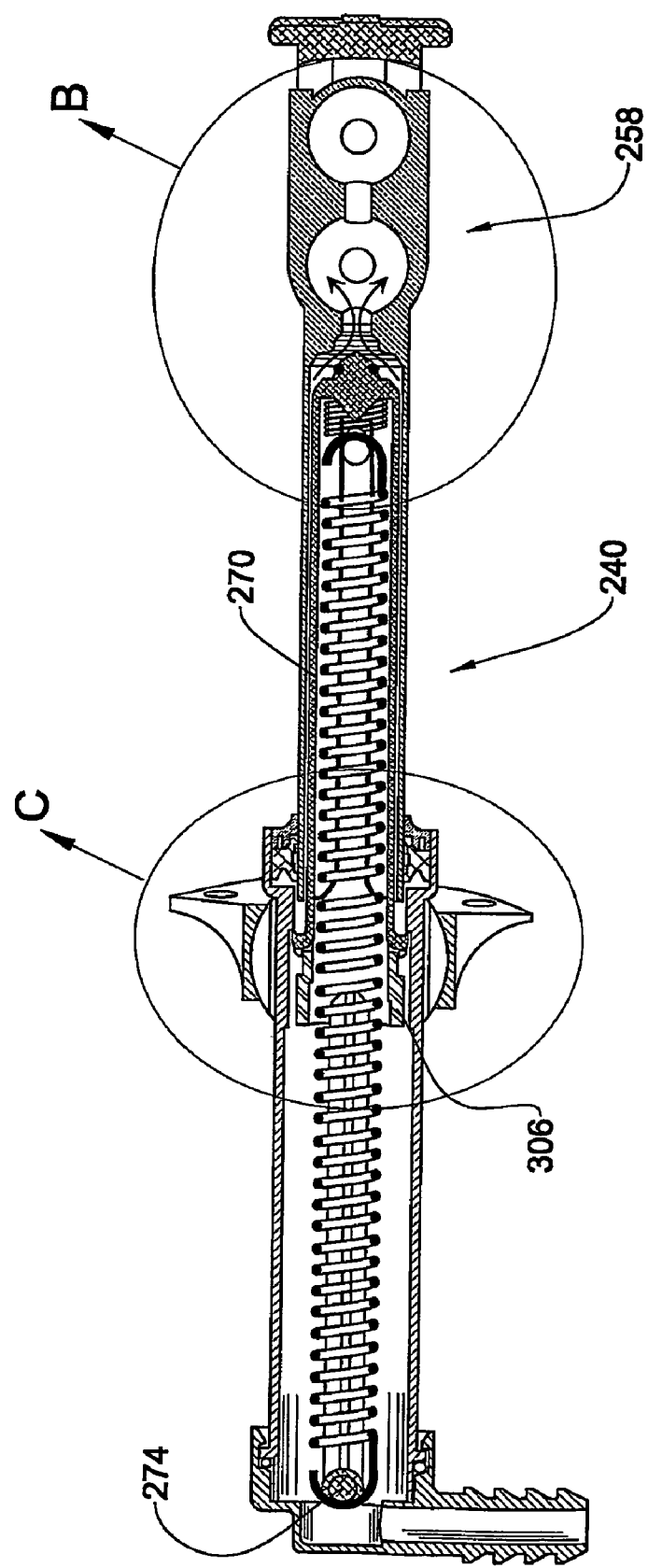
FIG. 18A illustrates the device in its fully extended and operative position.
Figure 18B:
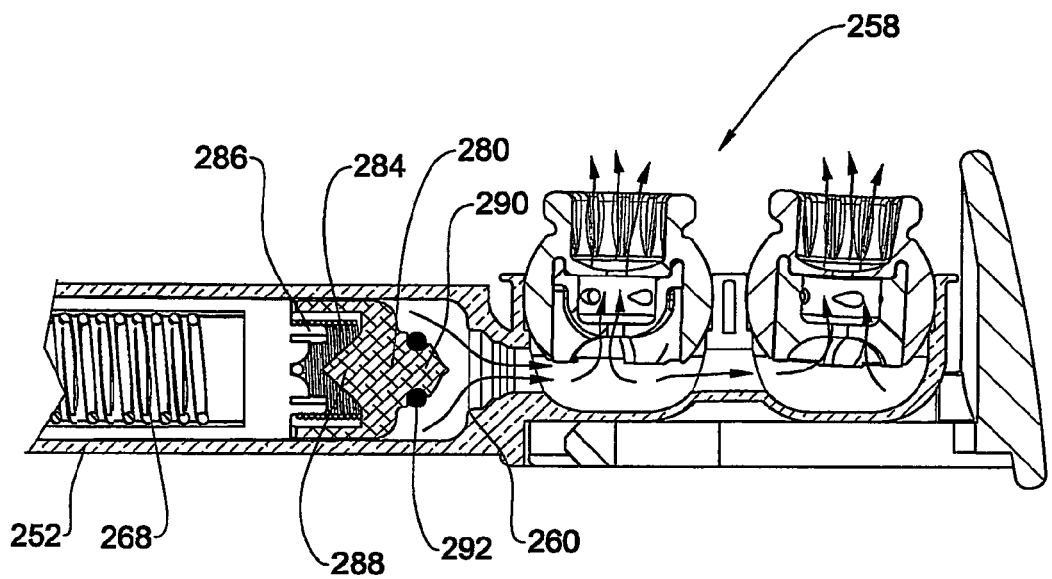
FIG. 18B is an enlarged portion of the section marked B in FIG. 18A, rotated by 90°.
Figure 18C:
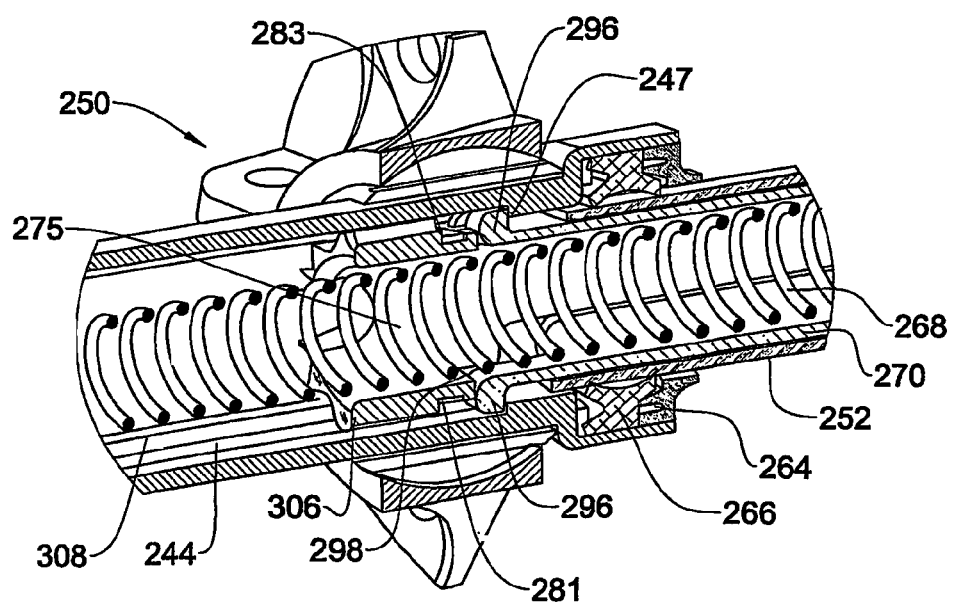
FIG. 18C is an enlargement of the portion marked C in FIG. 18A.
Figure 19A:
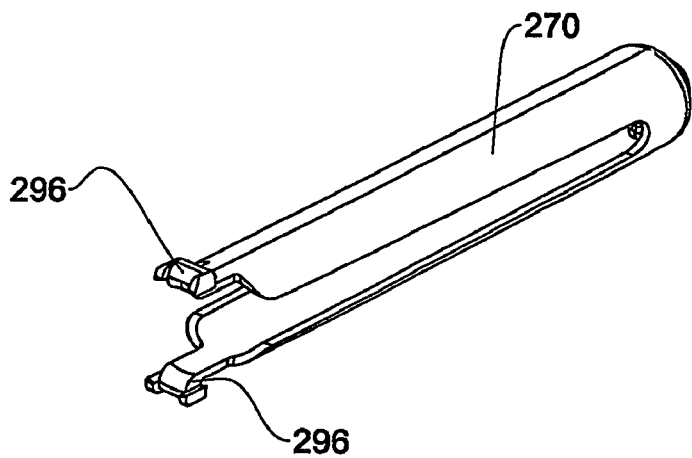
FIG. 19A is an isometric view of an inner segmented cylinder according to an embodiment of the invention.
Figure 19B:
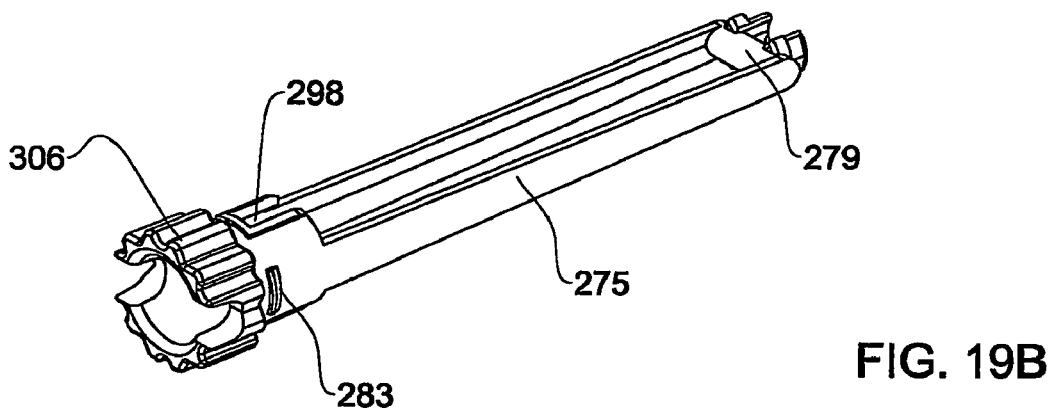
FIG. 19B is an isometric view of complimentary segmented spring support cooperating in conjunction with the inner segmented cylinder.
Figure 19C:
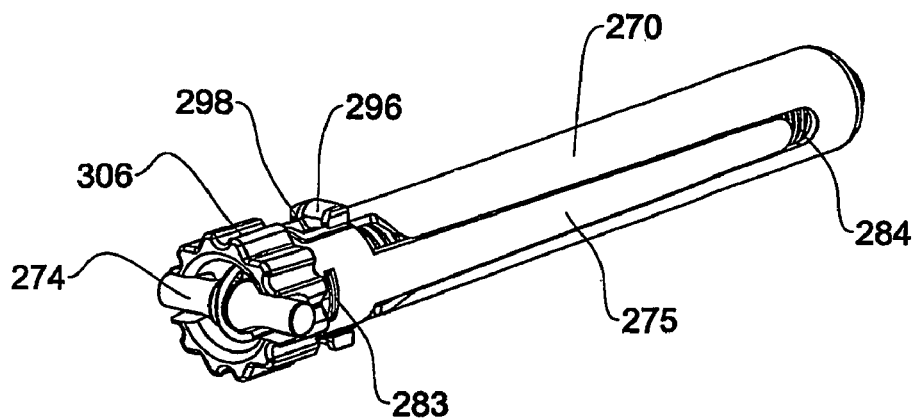
FIG. 19C is an isometric representation of the assembly comprising the inner segmented cylinder and the spring support.

As can further be seen, best in FIGS. 17B and 18B, intermediate a top end 278 of the spring support 275 and a top end 280 of the inner cylinder 270, there is an extension coiled spring 284 coaxially received therebetween and supported by axial projections 286 projecting from the spring support 275 and a tapering support 288 projecting from the top end 280 of the inner cylinder 270. The extension coiled spring 284 applies axial force between the inner cylinder 270 and the spring support 275, in a manner so as to part therebetween.

As can further be seen, the top end 280 of the inner cylinder 270 is fitted with a sealing projection 290 fitted with an O ring 292 adapted for sealing engagement with the narrow shoulder portion 260 (as in FIG. 18B).

The inner cylinder 270 is articulated to the spring support 275 by snap-type engagement facilitated by lateral projections 281 of the inner cylinder 270 arrested within corresponding grooves 283 formed at the proximal end of the spring support 275, thus being axially coupled.

With further reference to FIGS. 17C, 18C and 19A-19C, it is noticed that the inner cylinder 270 is formed at its bottom, proximal end, with two lateral projections 296 accommodated within corresponding windows 298 formed at the bottom, proximal end of the spring support 275. It is also seen that the lateral projections 296 occupy only a restricted portion of the cut-out windows 298, thus allowing for relative axial displacement of the inner cylinder 270 with respect to the spring support 275 as can be seen in the positions represented in FIGS. 17C and 18C, wherein in FIG. 18C the inner cylinder 270 is partially retracted with respect to the spring support 275. Even more so, the projections 296 radially extend sufficiently for arresting by the stopper portion 247 of the sleeved tube 244, as seen on FIGS. 17C and 18C.

Noticeably, the spring support 275 is formed at its proximal, bottom end, with an axially grooved rimed portion 306, sidable along inner ribs 308 radially projecting from the sleeved tube 244 (FIGS. 17C and 18C), so as to prevent rotation of the spring support 275 and the articulated inner cylinder 270 within the sleeved tube 244.

The arrangement is such that once the cleaning device has been initiated, liquid will enter the device through inlet port 246 and will remain in the jet cleaner also once the pump (not shown) is not activated.

Figure 16:
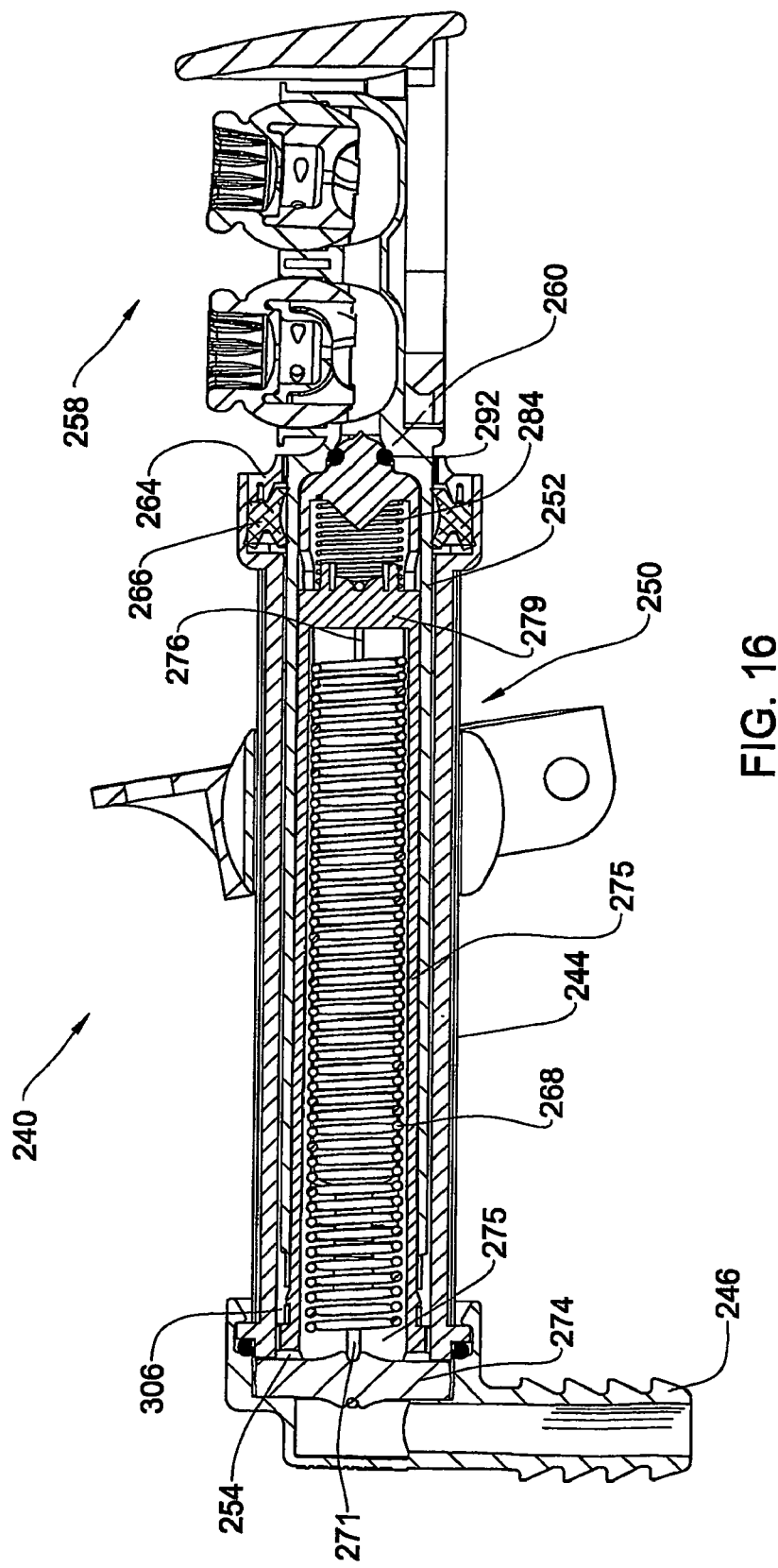
FIG. 16 is a sectioned view of a cleaning device in accordance with a third embodiment of the present invention, in a fully retracted position.

At an initial position of the device, the cylindrical body 252 is retracted within the sleeved tube 244 (FIG. 16). Upon supplying pressurized liquid to the jet cleaner 240, the liquid will thus access and occupy all spaces within the sleeved tube 244. At a non-pressurized state, the sealing O-ring 292 sealingly engages the narrow shoulder portion 260 as illustrated in FIGS. 16 and 18B, preventing water egress and, on the other end, preventing dirt ingress through the liquid discharge mechanism 258.

Upon pressure build up within the device, the cylindrical body 252 is forced to telescopically project from the sleeved tube 244 into the position illustrated in FIG. 17A wherein the neck 260 is still sealed by the O-ring 292, however, for an instant. As the cylindrical body 252 reaches its maximal projection the lateral projections 296 of the inner cylinder 270 encounter the stopper portion 247 of the sleeve tube 244 (FIG. 17C) thus arresting the inner cylinder 270 and preventing it from further axial displacement. However, the pressure within the device urges the cylindrical body 252 to further displace such that the sealing projection 290 of the inner cylinder 270 disengages from the narrow shoulder portion 260, allowing liquid flow therethrough into the liquid discharge mechanism 258 (FIG. 17B). Upon terminating the supply of pressurized liquid, the extension coiled spring 284 displaces the inner cylinder 270 axially into sealing engagement of the narrow shoulder portion 260 and further, the major retraction spring 268 telescopically retracts the assembled inner cylinder 270 with the spring support 275 and the cylindrical body 252 articulated thereto, into the retracted, inoperative state of FIG. 16.

Figure 20A:
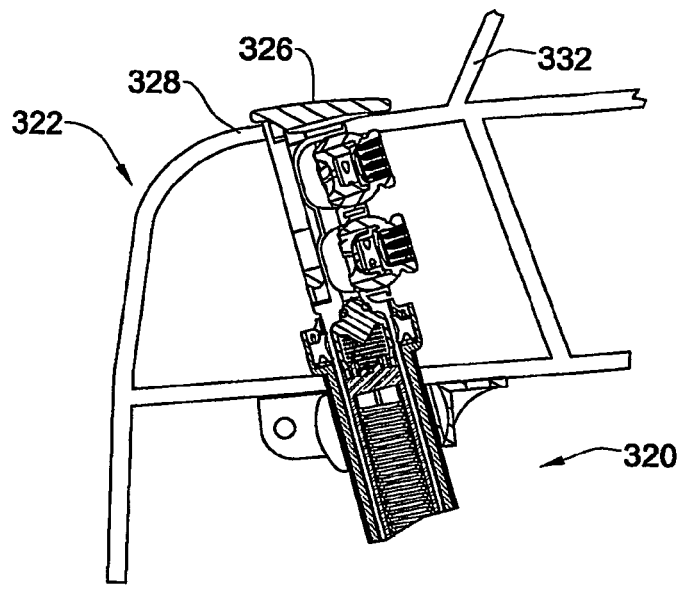
FIG. 20A is a sectioned view illustrating a cleaning device according to an embodiment of the invention, in a fully retracted position, mounted on a vehicle's bumper.
Figure 20B:
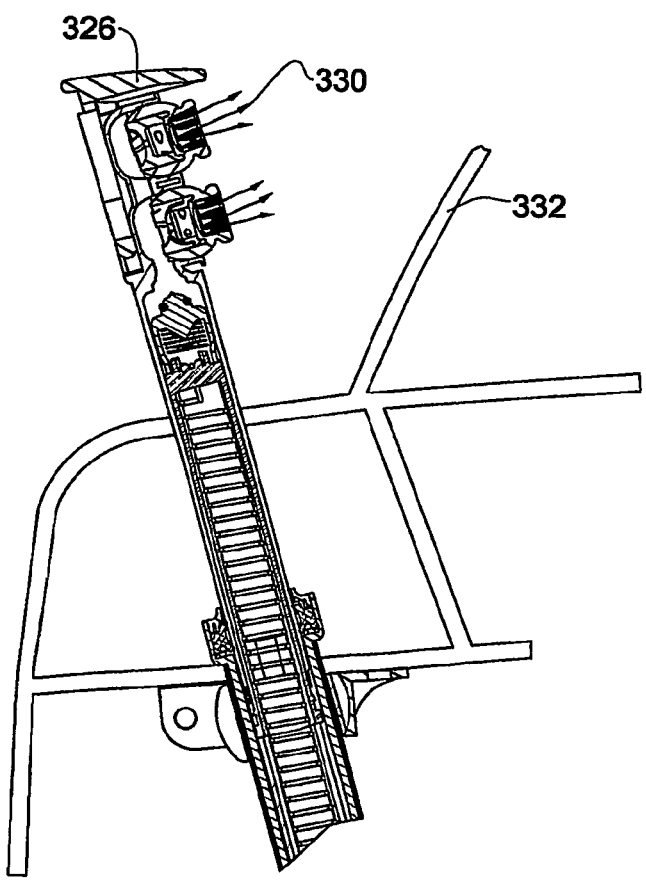
FIG. 20B illustrates the device of FIG. 20A in its extracted, operative position splashing rinsing liquid over the vehicle's headlights.

FIGS. 20A and 20B illustrate how a head lamp jet cleaning device in accordance with the present invention designated 320 is supported within a vehicle's bumper schematically represented at 322 such that at the retracted position (FIG. 20A) the cover 326 extends substantially flush with an upper surface 328 of the bumper 322 in a eye pleasing manner and substantially sealed to prevent entry of dirt into the space of the bumper and further, to ensure minimal interference of the device in front of the head light as in FIG. 20B which is the operative position illustrating how a jet of liquid 330 is used for rinsing the head lamp glass 332.

Further attention is now directed to FIGS. 21A to 21E and FIG. 22 directed to a jet nozzle generally designated 340, of the type illustrated, for example, in FIGS. 1, 4, 16 and others. The jet nozzle 340 comprises a housing 341 formed with a spherical portion 342 and a jet emitting portion 346 wherein the spherical portion is received within a suitable receptacle cavity formed in the head of the device such that it is snappingly articulated though in a rotatable fashion so as to allow for adjustment of a jet of liquid emitted therefrom.

The jet emitting portion 346 is formed with a plurality of recesses 348 provided for shaping the liquid jet and allowing air flow therethrough.

The housing 341 of the jet is formed with a receptacle fixedly receiving a jet forming member 350 dividing the receptacle into a liquid inlet chamber 354 and a liquid swirl chamber 356. The liquid inlet chamber 354 is in a liquid flow communication with the liquid supply through the jet head and upon activating of the pressure pump is charged with pressurized liquid.

Figure 22:
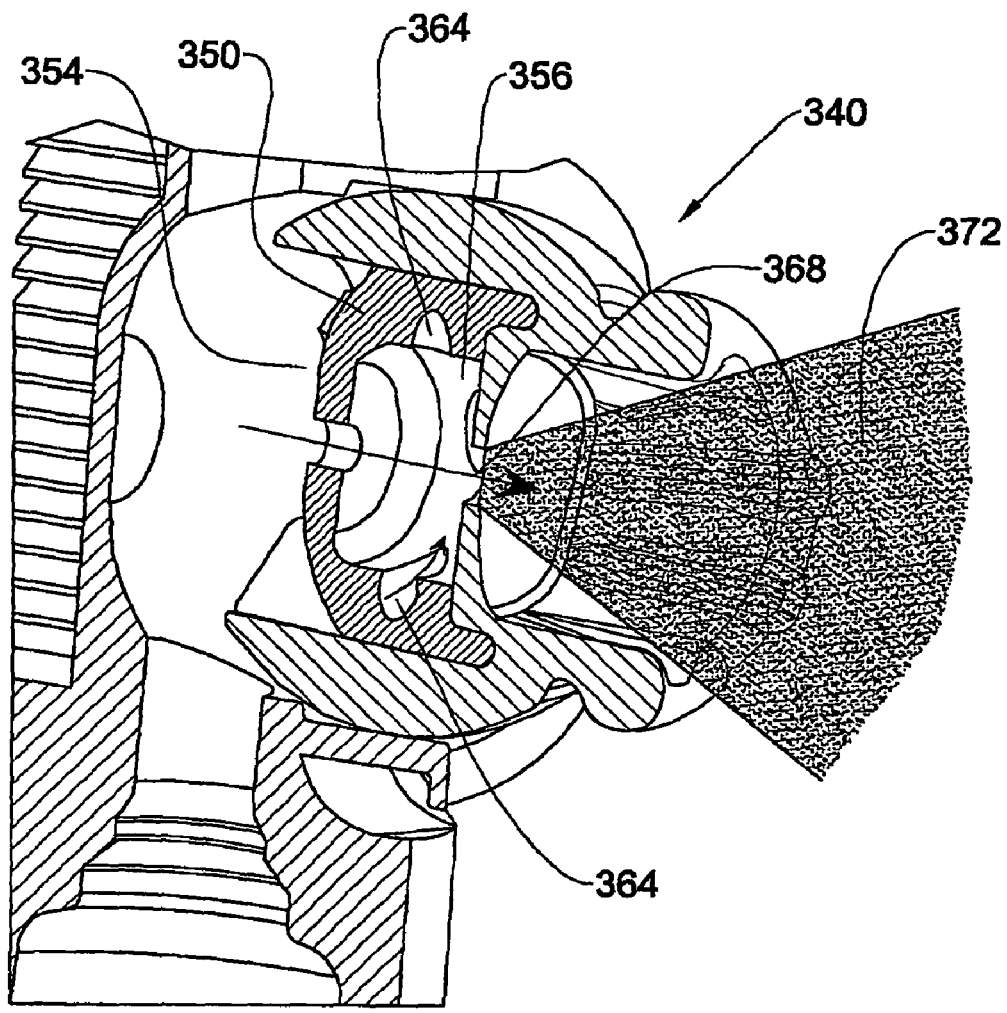
FIG. 22 is a sectioned isometric view of the jet nozzle illustrating the liquid distribution pattern of a liquid jet.

The liquid inlet chamber 354 is in liquid communication with the liquid swirl chamber 356 via a central, axial aperture 358 and a plurality of tangentially extending liquid ducts 360 extending into the liquid swirl chamber 356 via substantially tangential apertures 364 such that liquid entering the liquid swirl chamber 356 is turbulated and exits through a jet emitting aperture 368, formed in a wall portion 343 of the housing 341 between the spherical portion 342 and the jet emitting portion 346, in a substantially full cone of liquid jet as illustrated at 372 in FIG. 22. It is appreciated that the jet forming member 350 may also be formed with additional axial apertures, for example, to increased fluid supply therethrough.

Figure 23A:
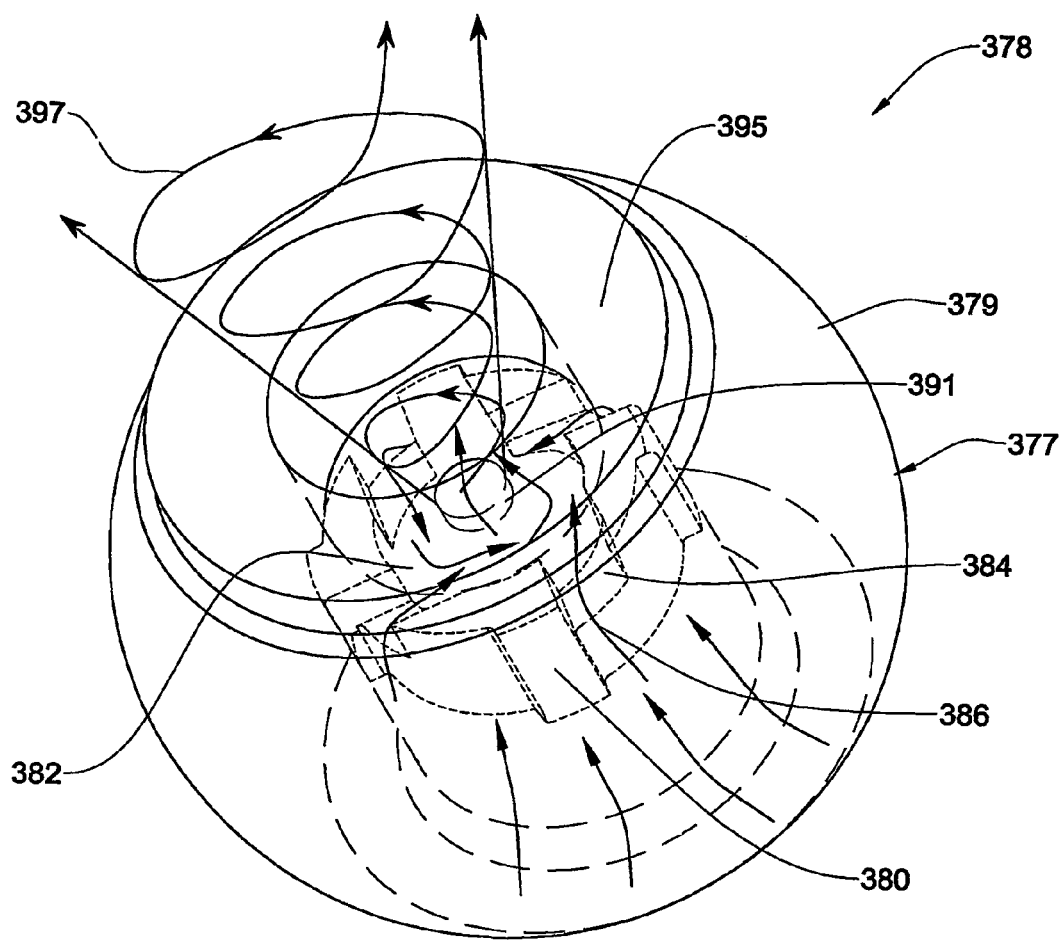
Figure 23B:
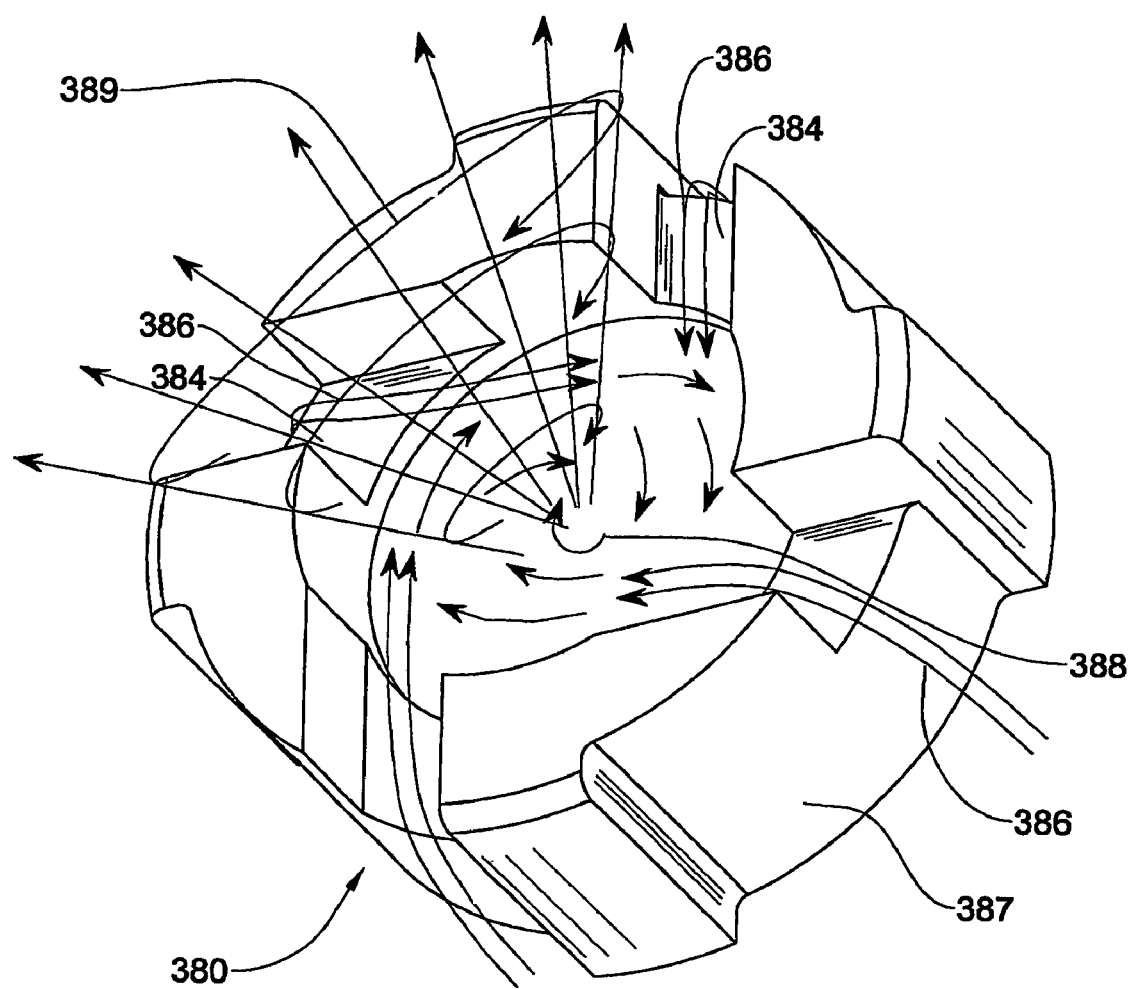
Figure 23C:
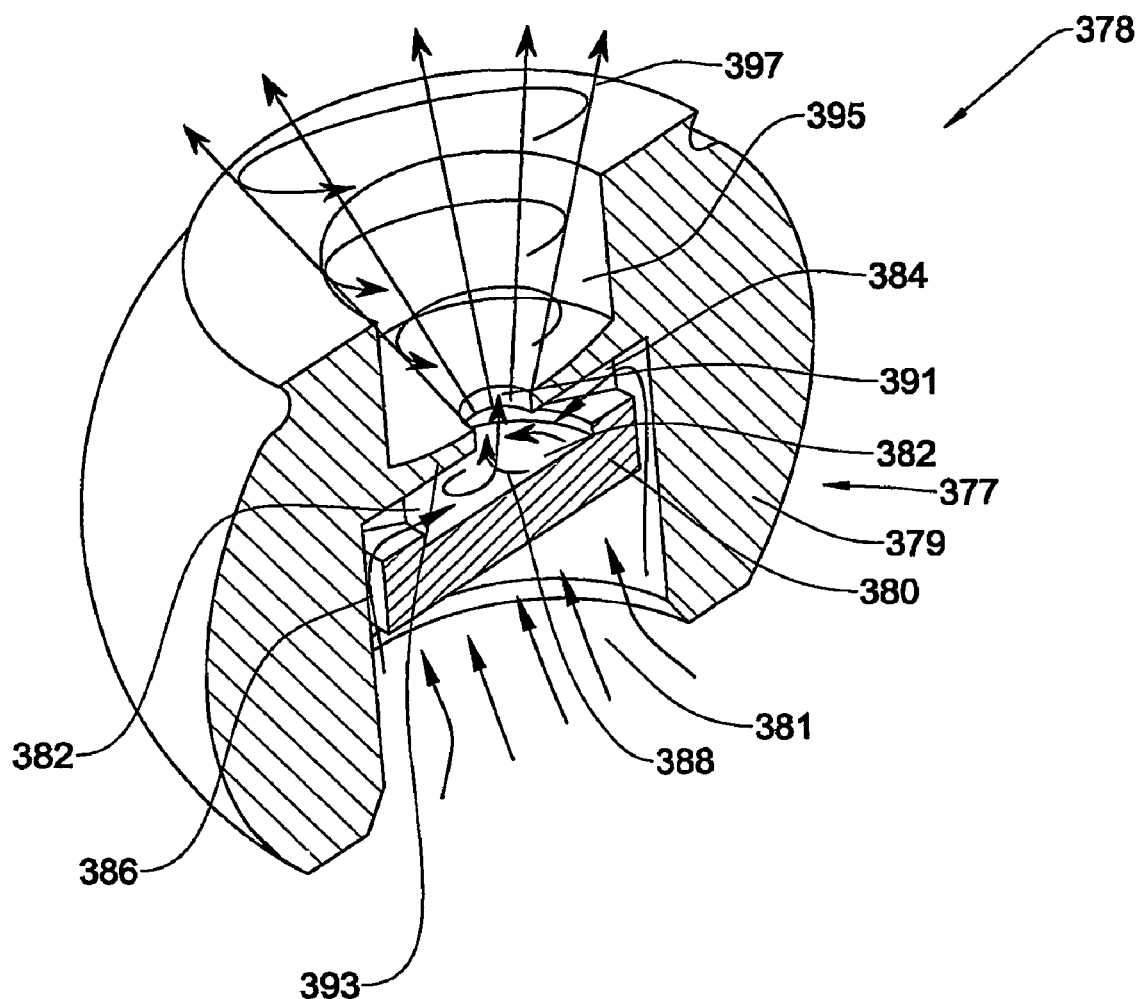

Turning attention now to FIGS. 23A to 23C, a jet nozzle generally designated 378 is illustrated and comprises a housing 377 and a jet forming member 380. The housing is formed with a jet emitting portion 395 and a spherical portion 379. The spherical portion 379 is fitted therein with an alternative jet forming member 380. The alternative jet forming member 380 is similar to the previously described jet forming member 350, with the exception that the alternative member 380 has no central axial aperture. Therefore the inlet chamber 381 of the jet nozzle 378 is in liquid communication with the liquid swirl chamber 382 only via tangential apertures 384 (four in the present example) originating from substantially axial channels 387 formed between the jet forming member 380 and the spherical portion 379 (in the form of axial peripheral grooves formed on the jet forming member 380).

The arrangement is such that liquid flowing from the inlet chamber 381 to the swirl chamber 382 (said flow between the chambers (381, 382) generally designated by arrows 386), via axial channels 387 and tangentially into the swirl chamber 382 through tangential apertures 384, results in a swirling turbulated jet flow 388, having an expanding conical shape designated at 389. The swirled jet 389 is then emitted through jet emitting aperture 391 formed in a wall portion 393 of the housing 377, said wall portion 393 extending between the swirl chamber 382 and the jet emitting portion 395, resulting in a swirled jet 397 emitted from the nozzle 378.

It has been observed that increasing or decreasing the number of tangential apertures of a jet forming member alters the divergence of the periphery of the expanding conical shape of the exiting jet flow, and that the increasing the diameter and/or number of an axial apertures increases the fluid supply to the exiting jet flow. Furthermore, it has also been noted that by increasing the divergence of the expanding conical shape of the exiting jet flow and reducing the diameter and/or number of axial apertures in a jet member, results in a reduction in the size of the fluid drops in the exiting jet flow. In contrast, it has also been noted that by decreasing the divergence of the expanding conical shape of the exiting jet flow and increasing the diameter and/or number of axial apertures in a jet member, results in an increase in the size of the fluid drops in the exiting jet flow. Therefore, jet nozzles in accordance with the present invention, may comprise a jet forming member with zero or more axial apertures of varying diameter and one or more tangential apertures, the number and size of which apertures being chosen in order to optimize the fluid usage and cleaning effectiveness of a surface.

The arrangement as disclosed hereinabove ensures that a liquid jet emitted through the jet nozzle is turbulated and when emitted over a head lamp glass covers a substantial effective area thereof for cleaning same. However, it should be noted that the liquid jet emitted need not necessarily be an expanding conical shape, for example it may not be expanding, it may have a rectangular-like cross section etc., as the shape of the liquid jet emitted will be a result of a number of different variable structural features of a jet nozzle according to the present invention. Accordingly, it should also be noted that the above described jet emitting apertures formed in a wall portion of the housings may be of varying shapes and sizes.

Whilst several embodiments have been shown and described, it is to be understood that it is not intended thereby to limit the disclosure of the invention, but rather it is intended to cover all embodiments, modifications and arrangements falling within the spirit and the scope of the present invention, as defined in the appended claims, mutatis mutandis.

The invention claimed is:

1. A vehicle light cleaning device, comprising:
    an elongate housing formed with an inlet port connectable to a source of pressurized rinsing liquid, a rinsing head fitted with at least one jet nozzle and mounted at a distal end of a telescopically retractable hollow tube, said tube being normally retracted;
    a liquid flow path extending between said rinsing head and an inside space of the housing;
    an inner cylinder accommodated in said hollow tube and having an open proximal end, said inner cylinder is formed at its distal end with a sealing member for sealing the flow path; and
    a stopper member provided at a distal end of the housing for arresting a lateral projection of the inner cylinder,
    whereby upon complete projection of the tube from the housing the inner cylinder is arrested so as to disengage the sealing member from the flow path and open it,
    wherein the light cleaning device is configured such that once the vehicle light cleaning device is initiated, liquid occupies all spaces within the housing and the housing remains occupied with liquid readily available for instantaneously projecting and emitting a rinsing jet.

2. A vehicle light cleaning device according to claim 1, wherein the flow path is a cylindrical path extending between a tubular portion of the tube and the rinsing head and the sealing assembly comprises a plug-like portion formed at the distal end of a plunger, fitted for sealing said cylindrical path.

3. A vehicle light cleaning device according to claim 2, wherein the sealing assembly comprises a plunger coaxially displaceable within the tube and formed at a distal end thereof with a sealing portion for sealing engagement of the flow path, and at a proximal end there is a lateral projection fitted for axial arresting by a stopper member extending adjacent a distal end of the housing, whereby only when the tube fully projects the sealing portion disengages so as to open the flow path.

4. A vehicle light cleaning device according to claim 1, wherein the tube is normally biased to retract by a biasing spring bearing at one end thereof at a proximal end of the tube and at an opposite end thereof against a portion of the housing.

5. A vehicle light cleaning device according to claim 1, wherein the tube is axially displaceable and sealingly retained within the housing by a sealing packing.

6. A vehicle light cleaning device according to claim 1, wherein the jet nozzle is angularly adjustable with respect to the rinsing head.

7. A vehicle light cleaning device according to claim 1, wherein the housing is fixable to a frame member of the vehicle by a joint facilitating adjusting the orientation of the housing with respect to the frame member in at least one of axial, pitch, yaw and roll degrees of freedom.

8. A vehicle light cleaning device according to claim 7, wherein the joint comprises a spherical surface axially fixable over the housing and a corresponding bracket fixable to a frame portion of the vehicle and clampingly secured to the spherical surface.

9. A vehicle light cleaning device according to claim 1, wherein the rinsing head is formed with a cover member which at a retracted position of the device extends substantially flush with a surface of a frame member of the vehicle supporting said device.

10. A vehicle light cleaning device according to claim 9, wherein the cover is fixed to the rinsing head in an adjustable manner so as to facilitate its positioning with respect to an aperture formed in the frame member, such that at the retracted position of the device the cover extends flush with a surface of the frame member.

11. A vehicle light cleaning device according to claim 1, wherein:
    said inner cylinder cooperating with an axially extending spring support member such that there is restricted axial displacement therebetween; and
    wherein a first coiled spring is articulated to the housing at a proximate end thereof with a distal end of the spring articulated to a distal end of the spring support.

12. A vehicle light cleaning device according to claim 11, wherein the inner cylinder is axially biased away from the spring support member by a second spring member.

13. A vehicle light cleaning device, comprising:
    an elongate housing formed with an inlet port connectable to a source of pressurized rinsing liquid, a rinsing head fitted with at least one jet nozzle and mounted at a distal end of a telescopically retractable hollow tube, said tube being normally retracted;
    a liquid flow path extending between said rinsing head and an inside space of the housing; and
    a normally closed sealing assembly configured to open the liquid flow path only responsive to full projection of the tube from the housing, wherein:
    the tube accommodates an inner cylinder having an open proximal end and is formed at its distal end with a sealing member for sealing the flow path;
    said inner cylinder cooperating with an axially extending spring support member such that there is restricted axial displacement therebetween;
    a first coiled spring is articulated to the housing at a proximate end thereof with a distal end of the spring articulated to a distal end of the spring support;
    a stopper member is provided at a distal end of the housing for arresting a lateral projection of the inner cylinder,
    whereby upon complete projection of the tube from the housing the inner cylinder is arrested so as to disengage the sealing member from the flow path and open it.

14. A vehicle light cleaning device according to claim 13, wherein the inner cylinder is axially biased away from the spring support member by a second spring member.

15. A vehicle light cleaning device according to claim 13, wherein the light cleaning device is configured such that once the vehicle light cleaning device is initiated, liquid occupies all spaces within the housing and the housing remains occupied with liquid readily available for instantaneously projecting and emitting a rinsing jet.

* * * * *